US012465650B2

United States Patent
Kolonin et al.

(10) Patent No.: US 12,465,650 B2
(45) Date of Patent: Nov. 11, 2025

(54) METHODS AND COMPOSITIONS FOR TARGETING CANCER CELLS IN METASTASES

(71) Applicant: THE BOARD OF REGENTS OF THE UNIVERSITY OF TEXAS SYSTEM, Austin, TX (US)

(72) Inventors: Mikhail Kolonin, Houston, TX (US); Alexes Daquinag, Houston, TX (US); Shraddha Subramanian, Houston, TX (US)

(73) Assignee: THE BOARD OF REGENTS OF THE UNIVERSITY OF TEXAS SYSTEM, Austin, TX (US)

( * ) Notice: Subject to any disclaimer, the term of this patent is extended or adjusted under 35 U.S.C. 154(b) by 0 days.

(21) Appl. No.: 17/819,474

(22) Filed: Aug. 12, 2022

(65) Prior Publication Data

US 2023/0056203 A1    Feb. 23, 2023

Related U.S. Application Data

(60) Provisional application No. 63/232,435, filed on Aug. 12, 2021.

(51) Int. Cl.
| | |
|---|---|
| A61K 47/64 | (2017.01) |
| A61P 35/04 | (2006.01) |
| C07K 14/47 | (2006.01) |

(52) U.S. Cl.
CPC .............. *A61K 47/64* (2017.08); *A61P 35/04* (2018.01); *C07K 14/4702* (2013.01)

(58) Field of Classification Search
CPC ....... A61K 47/64; A61K 51/088; A61P 35/04; C07K 14/4702; C07K 2319/00; C07K 2319/10; C07K 7/06
See application file for complete search history.

(56) References Cited

PUBLICATIONS

Subramanian, "A Screen for Peptides Targeting Chemoresistant Metastatic Triple-Negative Breast Cancer," Texas Medical Center Dissertations and Theses (Open Access). 1024 (Aug. 2020) (Year: 2020).*
UniProt Accession No. H0R009, accessed Mar. 1, 2025 at URL rest.uniprot.org/uniprotkb/H0R009.txt, 1 page (Year: 2025).*
UniProt Accession No. A0A914VDF9 accessed Mar. 1, 2025 at URL rest.uniprot.org/uniprotkb/A0A914VDF9.txt, 2 pages (Year: 2025).*
UniProt Accession No. A0A3R7PA95 accessed Mar. 1, 2025 at URL rest.uniprot.org/uniprotkb/A0A3R7PA95.txt, 2 pages (Year: 2025).*
UniProt Accession No. A0A370PAH6 (accessed Mar. 1, 2025 at URL rest.uniprot.org/uniprotkb/A0A370PAH6.txt, 1 page (Year: 2025).*
UniProt Accession No. A0A7Y0D6H5 accessed Mar. 1, 2025 at URL rest.uniprot.org/uniprotkb/A0A7Y0D6H5.txt, 2 pages (Year: 2025).*
UniProt Accession No. A0A8J1JWN5 (accessed Mar. 1, 2025 at URL rest.uniprot.org/uniprotkb/A0A8J1JWN5.txt, 1 page (Year: 2025).*
Adhikari, S., A. Azhdarinia, and M. G. Kolonin. "Probes for cancer metastasis imaging and therapeutic targeting." *Cell Signal* 1.1 (2023): 92-94.
Subramanian, Shraddha, et al. "Characterization of peptides targeting metastatic tumor cells as probes for cancer detection and vehicles for therapy delivery." *Cancer Research* 81.22 (2021): 5756-5764.

* cited by examiner

*Primary Examiner* — Lianko G Garyu
*Assistant Examiner* — Kristina M Hellman
(74) *Attorney, Agent, or Firm* — pH IP Law

(57) ABSTRACT

Methods and compositions are presented for use in diagnostic, imaging or targeting of therapeutic agents to treat cancer cells in metastases, such as where compositions and methods identify and employ peptides to selectively target cancer cells in metastases in mammals, both in vitro and in vivo.

17 Claims, 8 Drawing Sheets
(8 of 8 Drawing Sheet(s) Filed in Color)

Specification includes a Sequence Listing.

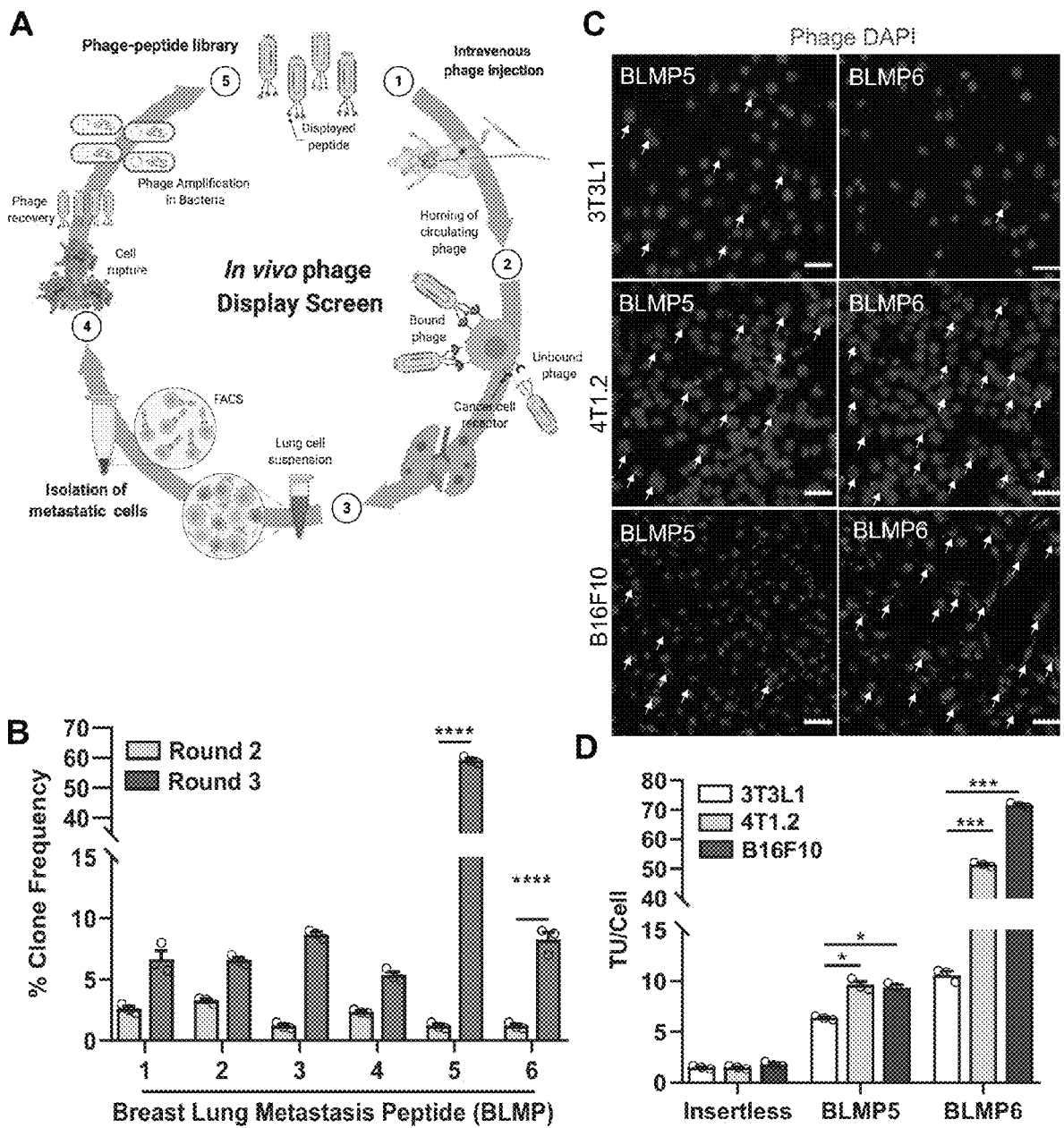
FIGS. 1A-D

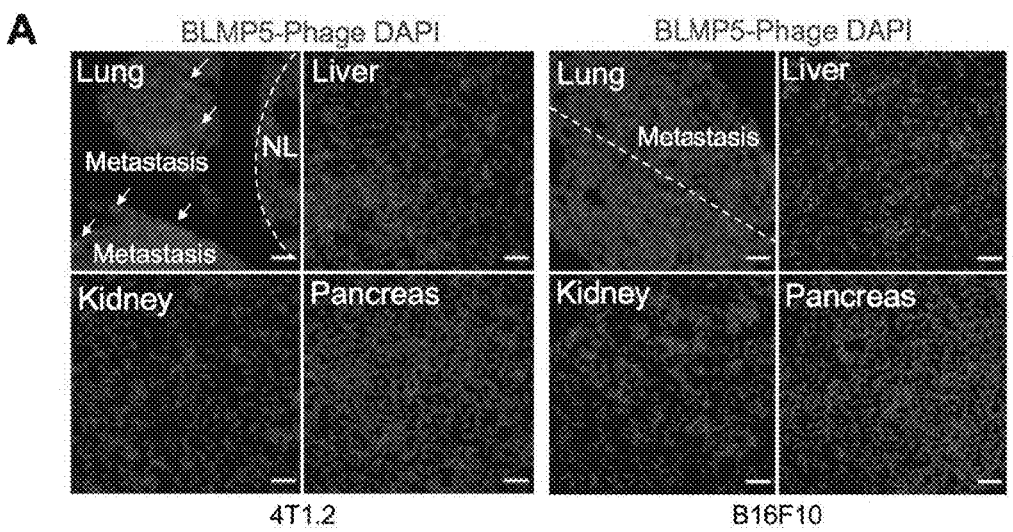
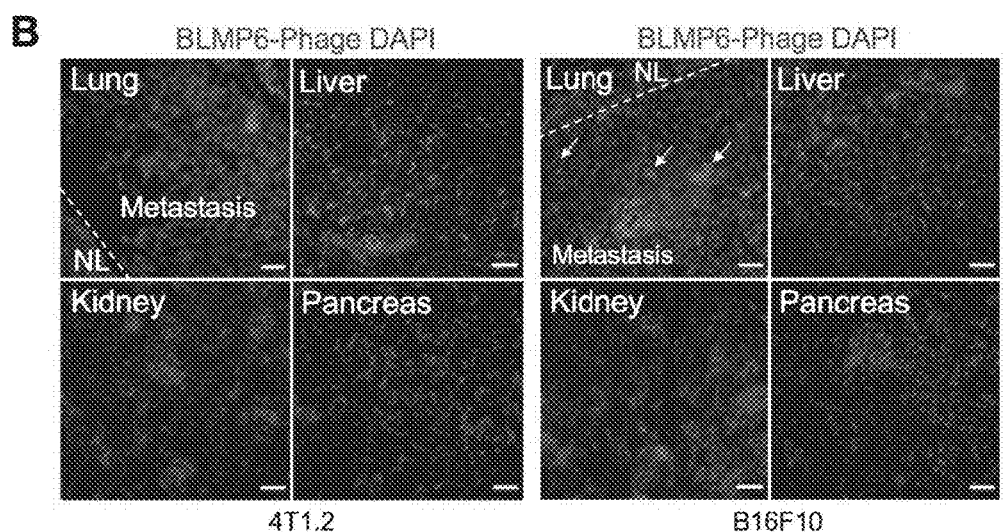
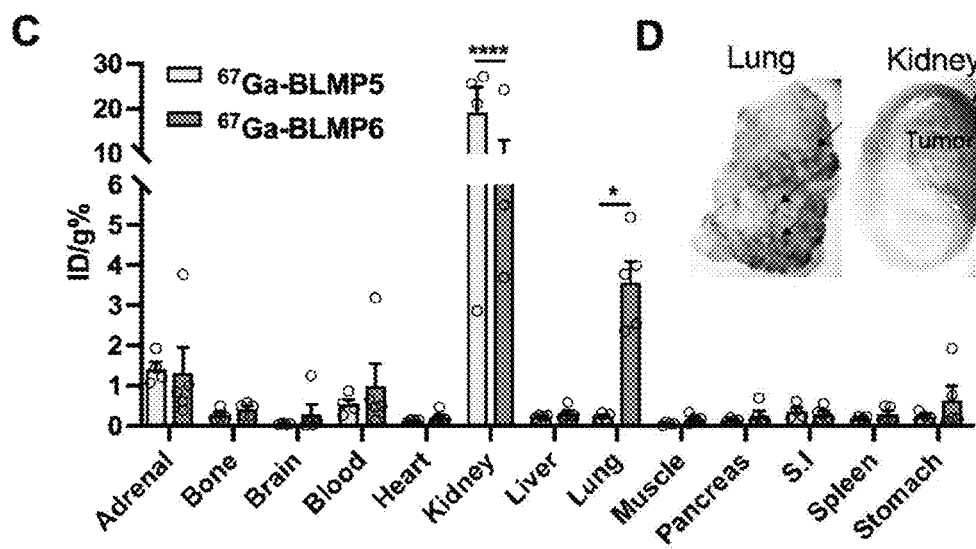
FIGS. 2A-D

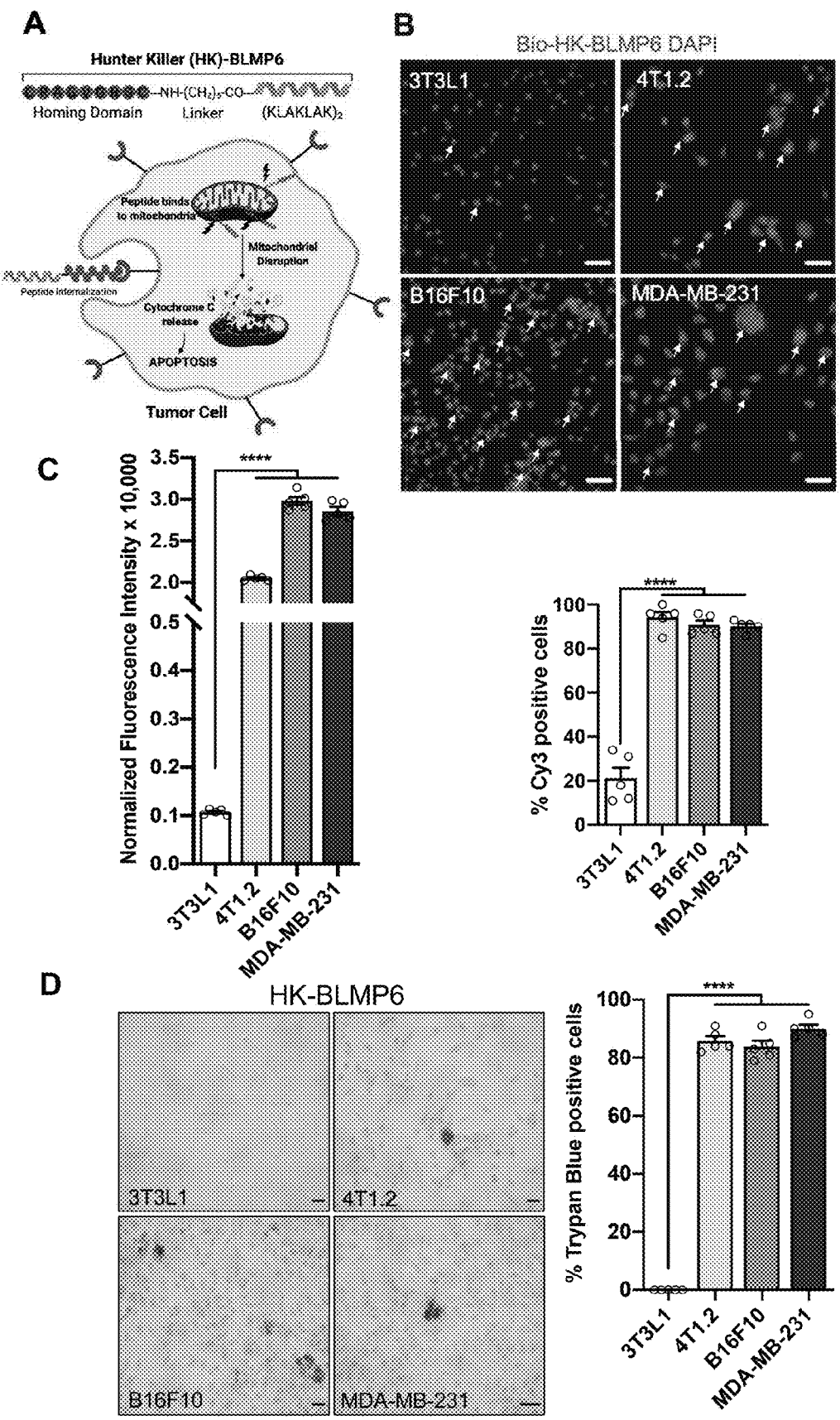
FIGS. 3A-D

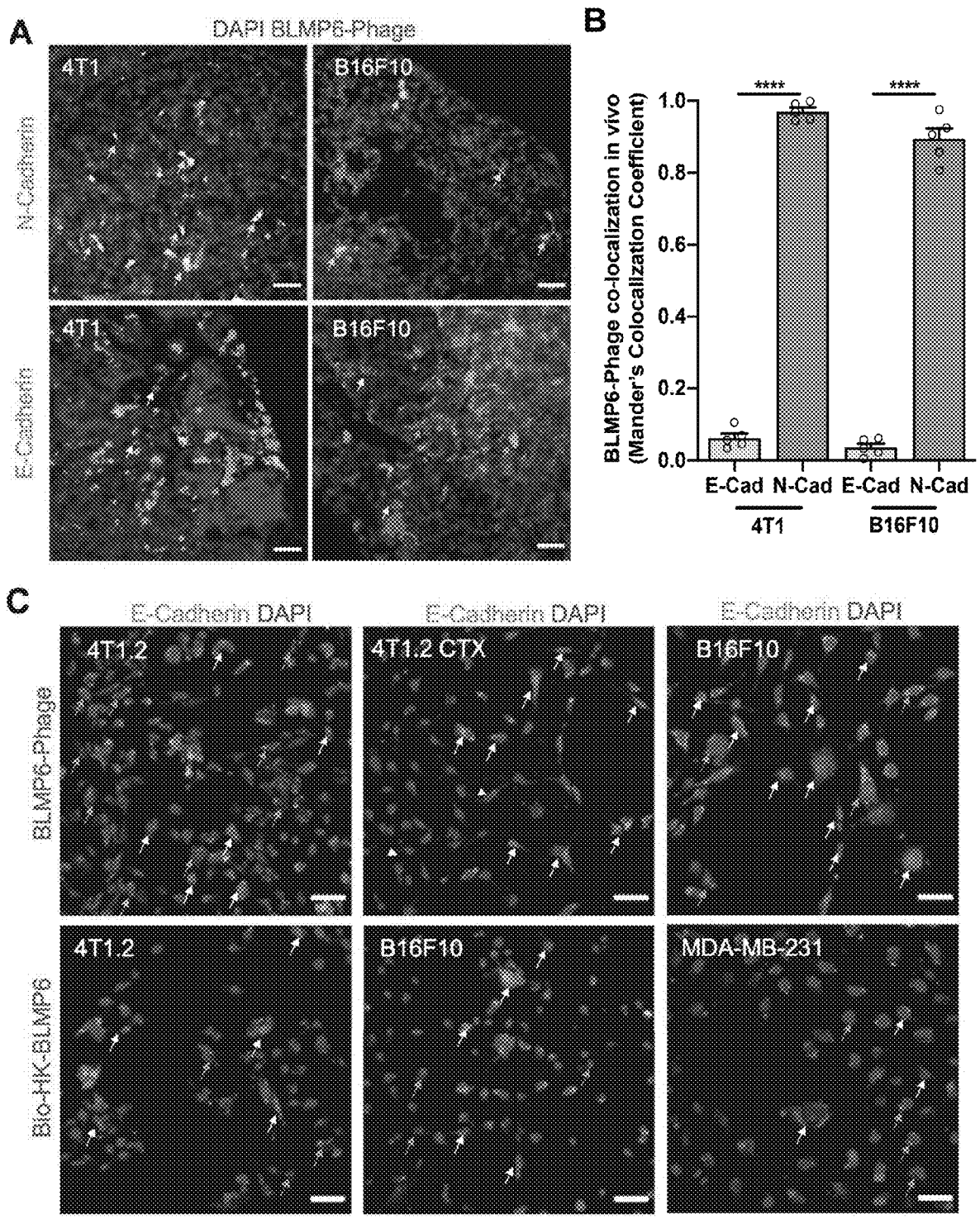
FIGS. 4A-C

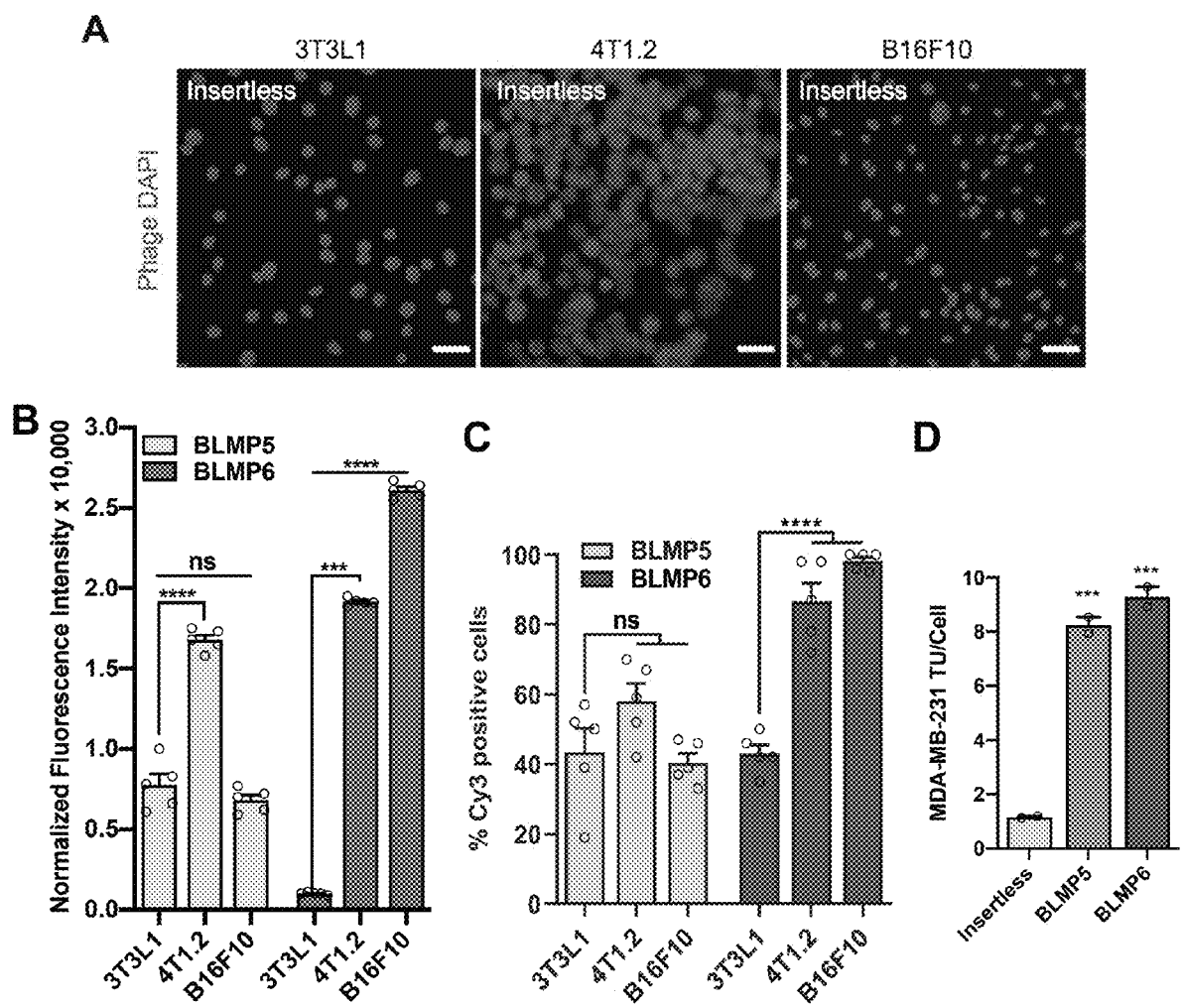
FIGS. 5A-D

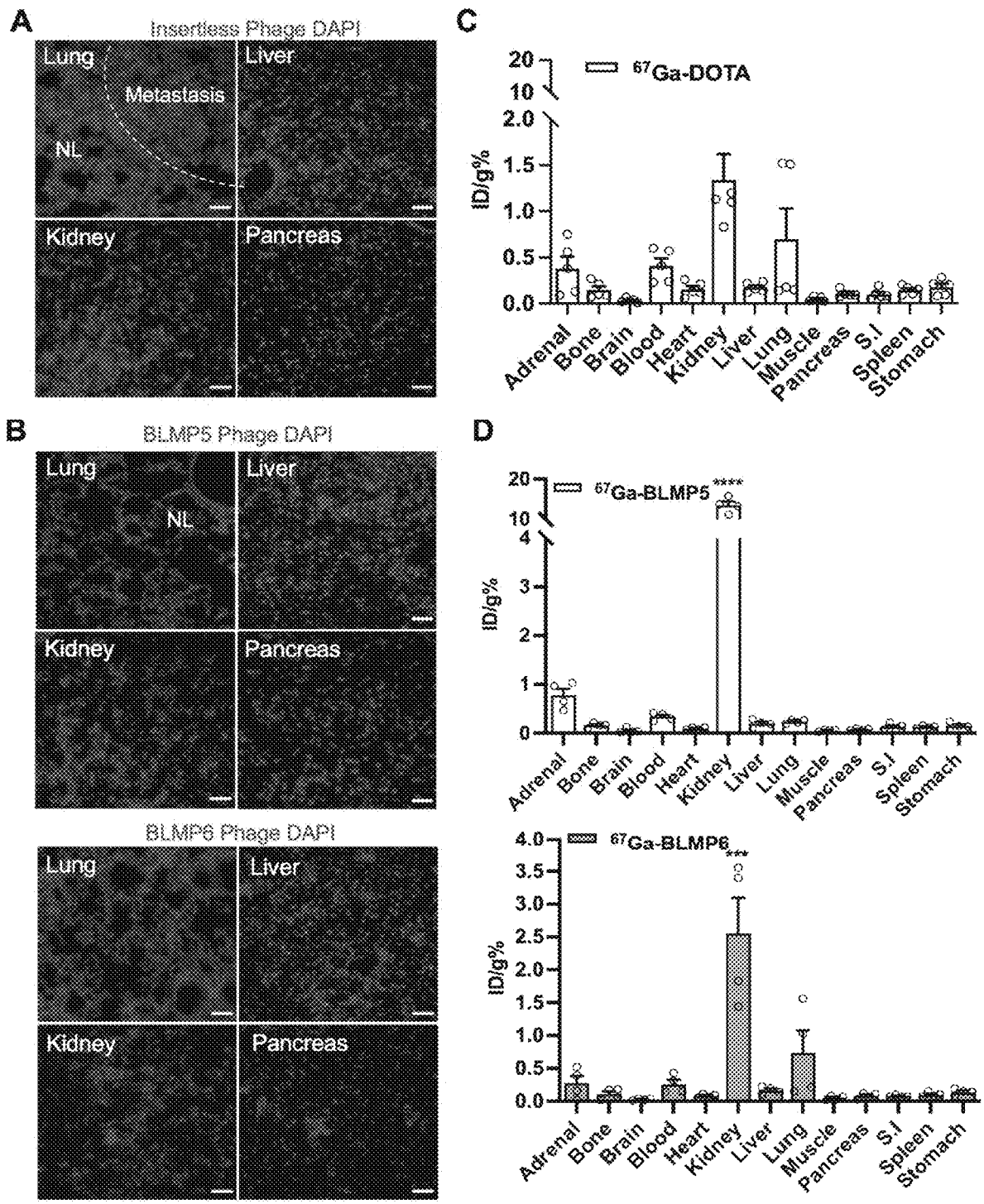
FIGS. 6A-D

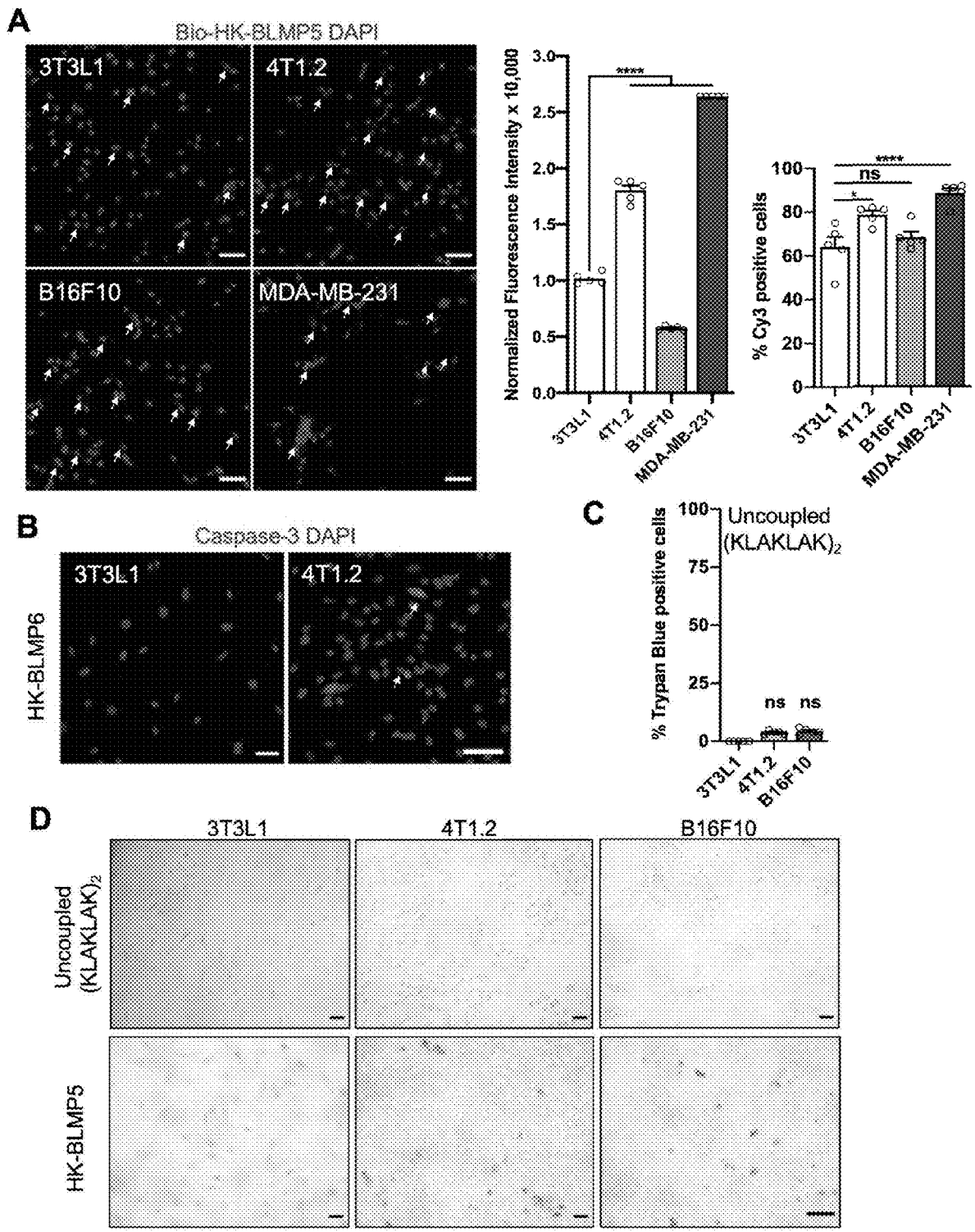
FIGS. 7A-D

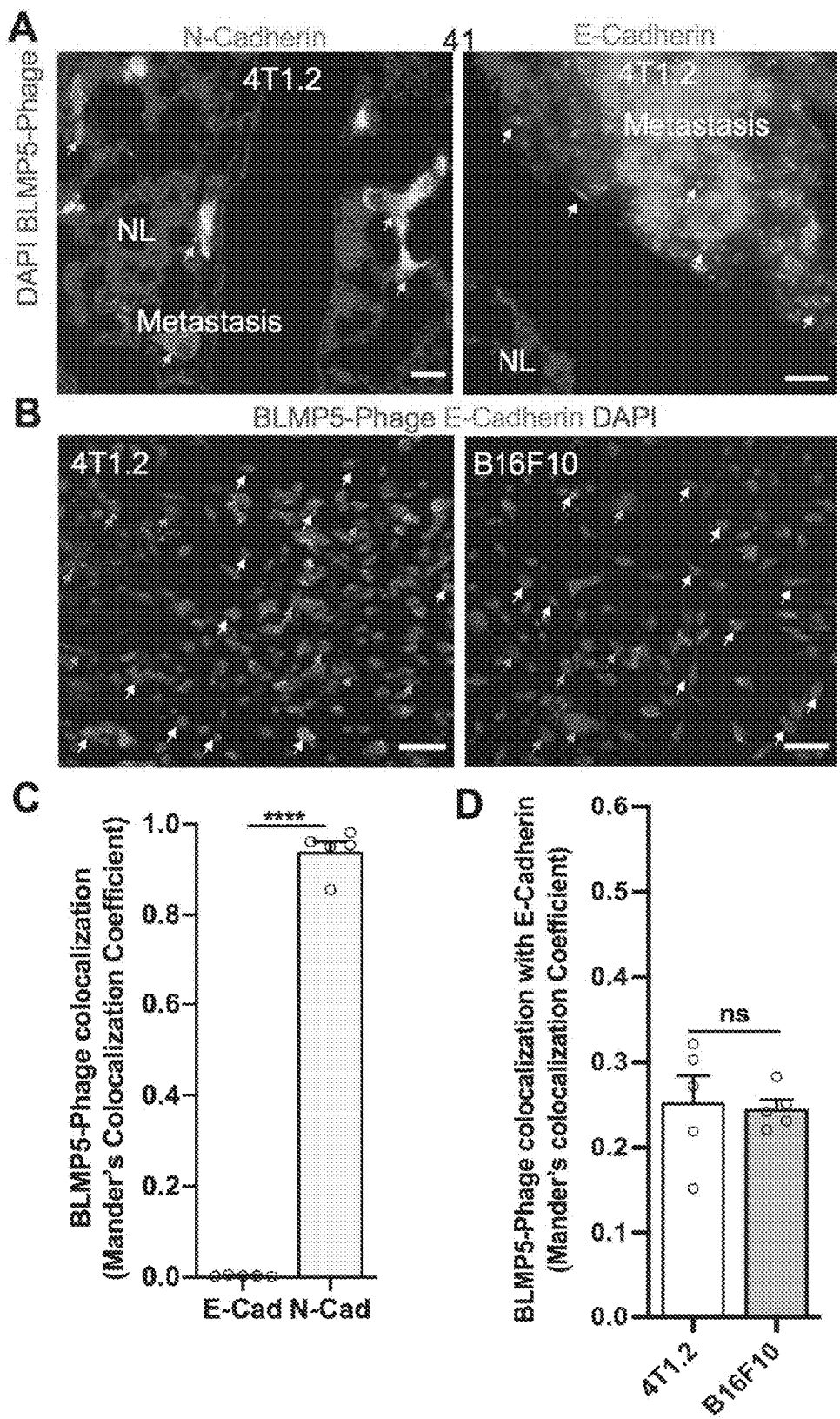
FIGS. 8A-D

METHODS AND COMPOSITIONS FOR TARGETING CANCER CELLS IN METASTASES

PRIORITY CLAIM

This application claims benefit of priority to U.S. Provisional Application Ser. No. 63/232,435, filed Aug. 12, 2021, the entire contents of which are hereby incorporated by reference.

REFERENCE TO SEQUENCE LISTING

This application contains a Sequence Listing XML, which has been submitted electronically and is hereby incorporated by reference in its entirety. Said XML Sequence Listing, created on Jul. 22, 2022, is named UTSHP0376US.xml and is 29,649 bytes in size.

BACKGROUND

Technical Field

This disclosure relates to methods and compositions which can be used to target delivery of therapeutic agents. More specifically, the present disclosure relates to compositions and methods for identification and use of peptides that selectively target metastatic cancer cells in mammals both in vitro and in vivo.

Background

Metastatic progression to therapy-resistant stages remains the overriding cause of cancer-associated mortalities. Metastasis from primary carcinomas is mediated by a hierarchical series of events. The ability of tumors to survive therapy directed at primary tumors and invade other tissues is rooted in the phenotypic plasticity of cancer cells. The latent developmental program of epithelial to mesenchymal transition (EMT) underlies the plasticity of carcinomas cells. EMT encompasses the continuum of morphological and genomic transitions observed during carcinoma progression. Besides exacerbating the invasive, migratory and metastatic potential of cancer cells at the invasive tumor front, the EMT endows malignant cells with therapy-resistance properties. Currently, there are no effective approaches for early detection of these cells in tumors. Development of imaging probes for mesenchymal cancer cells enable timely detection of aggressive and metastatic cancers. Such probes can be used for prognostic and therapeutic strategies to target these aggressive cancer cells and improve patient outcomes.

SUMMARY

The presently disclosed methods and compositions are based, in part, on the discovery and identification of certain peptides that can be used to aid in diagnosis, prevention, and/or treatment of metastatic cancer cell tissue in mammals.

In some embodiments of the present invention, a targeting peptide comprises an amino acid sequence selected from the group consisting of BLMP1-6 (SEQ ID NOS: 1-6), wherein said peptide binds to metastatic cancer cell tissue. In another embodiment of the present invention, the targeting peptide comprises the BLMP6 amino acid sequence CRAGVGRGC (SEQ ID NO 1). In other embodiments described herein, a protein composition comprises a targeting peptide, and in a further embodiment a protein composition comprises the BLMP6 amino acid sequence.

In some embodiments, the targeting peptide is composed entirely of D-amino acids, in other embodiments, the targeting peptide is composed entirely of L-amino acids, and in further embodiments the targeting peptide may comprise L amino acids, D amino acids or combinations thereof.

In some embodiments of the invention, a protein composition comprises BLMP6, wherein BLMP6 is comprised of D-amino acids, and wherein said composition binds to stromal cells in metastatic tumor cell tissue.

In some embodiments of the protein composition of the current invention, a targeting peptide is coupled to an effector agent selected from the group comprising: an imaging agent; a cytotoxic agent; a pro-apoptotic agent; a fusion protein; a cytostatic agent; a cytocidal agent; radioisotope; an ACS cell differentiating agent; mitotic inhibitors, antitumor agents; antibiotic agent, enzymes; chemotherapeutic agent; anti-angiogenic agents or a combination thereof.

In some embodiments, of the protein composition, the targeting peptide and effector agent are comprised of D-amino acids; in other embodiments of the protein composition, the targeting peptide is comprised of L-amino acids, and the effector comprises D-amino acids; in further still embodiments of the protein composition, targeting peptide is comprised of L-amino acids, and the effector comprises L-amino acids.

In one embodiment a method of making a protein composition to target metastatic tumor cell tissue comprises: coupling an effector agent to a targeting peptide, wherein the targeting peptide is comprised of an amino acid sequence selected from the group consisting of BLMP1-6 (SEQ ID NOS: 1-6); and wherein said targeting peptide selectively targets cellular metastatic tumor cell tissue. In further embodiments, the effector agent and targeting peptide are comprised of D-amino acids. In other embodiments the effector is comprised of L-amino acids; and the targeting peptide are comprised of D-amino acids.

In some embodiments of the method of making a protein composition disclosed herein, coupling comprises linking said effector agent to said targeting peptide with a linking moiety; in further embodiments, the linking moiety comprises aminohexanoic acid; $(CH_2)_4$; $(CH_2)_5$; $(CH_2)_6$; $(CH_2)_7$; $(CH_2)_8$ or a combination thereof. In some embodiments of the method of method of making a protein composition disclosed herein, the effector agent is selected from the group comprising a cytotoxic agent; a pro-apoptotic agent; an imaging agent or combinations thereof.

In some embodiments a method of delivering an effector agent to an metastatic tumor cell tissue comprises: exposing a protein composition comprising: an effector agent coupled to a peptide, wherein the peptide is comprised of an amino acid sequence less than 100 amino acids in length, and wherein the amino acid sequence comprises a metastatic tumor cell tissue targeting peptide moiety having an amino acid sequence selected from the group consisting of BLMP1-6 (SEQ ID NOS: 1-6); to a population of cells comprising metastatic tumor cell tissue. In further embodiments, the protein composition comprises a linker, and in said linker may be comprised of comprises aminohexanoic acid; $(CH_2)_4$; $(CH_2)_5$; $(CH_2)_6$; $(CH_2)_7$; $(CH_2)_8$ or a combination thereof. In some embodiments the targeting peptide motif is comprised of D-amino acids. In other embodiments, the effector agent and said targeting peptide are comprised of D-amino acids. In some embodiments of the method of delivering an effector agent to a metastatic tumor cell described herein, the agent comprises: a cytotoxic agent; a pro-apoptotic agent; an imaging agent or combinations thereof, and in further embodiments the agent is comprised of D-amino acids.

In some embodiments of the method of delivering an effector agent to an metastatic tumor cell tissue, said exposing comprises: exposing a subject to said protein composition to treat metastatic tumor cell associated disorder and in further embodiments, said population of cells is in a mammalian subject; in still further embodiments, the population of cells is in a human subject; in some other embodiments, the population of cells is a thin section of a tissue.

Some embodiments of the method of delivering an effector agent to metastatic tumor cell tissue further comprising detecting metastatic tumor cells based on said selective binding of protein composition to said metastatic tumor cell tissue. In other embodiments the method of the delivering an effector agent to metastatic tumor cell tissue. In one embodiment a peptide is disclosed comprising an amino acid sequence selected from the group consisting of SEQ ID NOS: 16, wherein said peptide binds to lung tissue. In further embodiments a protein composition is disclosed comprising a peptide comprising a sequence selected from SEQ ID NOS: 1-6 or combinations thereof. In further embodiments, the protein composition is comprised of D-amino acids. In some embodiments of the protein composition, the peptide is coupled to an imaging agent; a cytotoxic agent; a pro-apoptotic agent or combinations thereof.

In some embodiments of the protein composition disclosed herein, the composition comprises a targeting peptide and an effector agent, wherein said effector agent comprises: gramicidin; magainin; mellitin; defensing; cecropin; (KFAKFAK)$_2$ (SEQ ID NO: 17), (KFXAKFXAK)$_2$ (SEQ ID NO: 18); (KHexAKHexAK)$_2$(KLAKLAK)$_2$ (SEQ ID NO 19); (KLAKKLA)$_2$ (SEQ ID NO: 14); (KAAKKAA)$_2$ (SEQ ID NO: 15); (KLGKKLG)$_3$ (SEQ ID NO: 16); angiotensin; laminin peptides; fibronectin peptides; plasminogen activator inhibitors; tissue metalloproteinase inhibitors; interferons; interleukin 12; platelet factor 4; IP-10; Gro-f3; thrombospondin; 2-methoxyoestradiol; proliferin-related protein; carboxiamidotriazole; CM101; Marimastat; pentosan polysulphate; angiopoietin 2 (Regeneron); interferon-alpha; herbimycin A; PNU145156E; 16K prolactin fragment; Linomide; thalidomide; pentoxifylline; genistein; TNP470; endostatin; paclitaxel; accutin; angiostatin; cidofovir; vincristine; bleomycin; AGM-1470; platelet factor 4 or minocycline; 5-fluorouracil; bleomycin; busulfan; camptothecin; carboplatin; chlorambucil; cisplatin (CDDP); cyclophosphamide; dactinomycin; daunorubicin; doxorubicin; estrogen receptor binding agents; etoposide (VP16); farnesyl-protein transferase inhibitors; gemcitabine; ifosfamide; mechlorethamine; melphalan; mitomycin; navelbine; nitrosurea; plicomycin; procarbazine; raloxifene; tamoxifen; taxol; temazolomide (an aqueous form of DTIC); transplatinum; vinblastine and methotrexate; vincristine; alkylating agents; antimetabolites; antitumor antibiotics; corticosteroid hormones; mitotic inhibitors; nitrosoureas; hormone agents; mitotic inhibitors; antitumor antibiotics; enzymes; biological response modifiers; plant alkaloids; docetaxel; etoposide (VP16); teniposide; paclitaxel; taxol; vinblastine; vincristine; vinorelbine; PPAR-gamma agonists thiazolidinediones; rosiglitazone; fluorophores; metal chelate complexes; radioisotopes; fluorescent markers; urease; alkaline phosphatase; liposomes; microcapsules; microparticles; nanoparticles; magnetic beads; microdevices; bleomycin; dactinomycin; daunorubicin; doxorubicin (Adriamycin); plicamycin (mithramycin) and idarubicin; platinum coordination complexes; anthracenediones; substituted ureas; methyl hydrazine derivatives; amsacrine; L-asparaginase; and tretinoin. Carboplatin; cisplatin (cis-DDP); mitoxantrone; hydroxyurea; procarbazine; IgFc fusions proteins; enzyme fusion proteins; fluorescent protein; luminescent proteins or combinations and analogs thereof.

Thus, embodiments described herein comprise a combination of features and advantages intended to address various shortcomings associated with prior art methods of diagnosis, prevention, and/or treatment of metastatic tumor cell associated disorders. The various characteristics described above, as well as other features, will be readily apparent to those skilled in the art upon reading the following detailed description, and by referring to the accompanying drawings.

The use of the word "a" or "an" when used in conjunction with the term "comprising" in the claims and/or the specification may mean "one," but it is also consistent with the meaning of "one or more," "at least one," and "one or more than one." The word "about" means plus or minus 5% of the stated number.

It is contemplated that any method or composition described herein can be implemented with respect to any other method or composition described herein. Other objects, features and advantages of the present disclosure will become apparent from the following detailed description. It should be understood, however, that the detailed description and the specific examples, while indicating specific embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following drawings form part of the present specification and are included to further demonstrate certain aspects of the present disclosure. The disclosure may be better understood by reference to one or more of these drawings in combination with the detailed description of specific embodiments presented herein.

FIGS. 1A-D depict the screen for lung metastatic tumor cell-homing peptides. (FIG. 1A) Experimental schematic of the synchronous lung metastasis-specific bio-panning in a murine TNBC model performed over three rounds. (FIG. 1B) Comparative analysis of lung metastasis-homing peptide clone (BLMP1 through BLMP6) recovery frequency over the last two rounds of combinatorial peptide library screening. (FIG. 1C) Anti-phage immunofluorescence (red) in 3T3L1 preadipocytes versus 4T1.2 and B16F10 tumor cell lines incubated with phage-displayed BLMP5 and BLMP6 clones over 8 hours. Upon digital merging, BLMP6-Phage shows higher tumor cell-specific internalization (white arrows). (FIG. 1D) Quantification of peptide clone binding as a ratio of phage transforming units (TU) recovered per cell. Cells incubated with control insert-less phage: background binding. For all cases, data are represented as mean±S.E.M. for triplicate measurements. Error bars: *, $p \leq 0.05$; *, $p \leq 0.001$; **, $p \leq 0.0001$ (Tukey's multiple comparisons test). Nuclear staining is blue. Scale bars, 50 μm.

FIGS. 2A-D depict that BLMP6 exhibits specificity for pulmonary metastases. (FIG. 2A and FIG. 2B) Anti-phage immunofluorescence (red) to validate pulmonary metastatic tumor cell homing of individual phage-displayed peptide clones via intravenous administration of $10^{10}$ TU into mice. Nuclear staining is blue. Scale bars, 50 μm. After 3 hours of circulation (FIG. 2A), BLMP5-Phage exhibits localization on pulmonary metastatic tumor cells (white arrows) but not in normal lung (NL) tissue in 4T1.2 (top) and not B16F10 (bottom) murine models. Liver trapping of phage is non-specific. Phage is absent in other organs. (FIG. 2B) Superior selectivity for BLMP6-phage for lung metastatic tumor cells (white arrows) is observed in 4T1.2 (top) and B16F10 (bottom) murine models. Non-specific phage trapping observed in liver. (FIG. 2C) Biodistribution of 5 nM $^{67}$Ga-labelled BLMP5 and 5 nM $^{67}$Ga-labelled BLMP6 in tumor implanted C57BL/6 mice. Radioactive peptide uptake presented as mean % ID/g. High uptake of radio-labelled peptides observed in the kidneys. (FIG. 2D) Representative lungs and kidney from a mouse injected with 5 nM $^{67}$Ga-BLMP6. High $^{67}$Ga-BLMP6 uptake is observed in lungs and kidneys bearing metastases. Error bars: *, $p \leq 0.05$; ****, $p \leq 0.0001$ (Tukey's multiple comparisons test). Scale bars, 50 μm.

FIGS. 3A-D show that Hunter-killer BLMP6 (HK-BLMP6) induces tumor cell specific death in cell culture. (FIG. 3A) Schematic representation of HK-BLMP6 design and mechanism of apoptosis induction, homing domain is CRAGVGRGC (SEQ ID NO: 1). (FIG. 3B) Visualization of biotinylated HK-BLMP6 (Bio-HK-BLMP6) internalization by immunofluorescence. Nuclear staining is blue. Bio-HK-BLMP6 exhibits significant tumor cell specificity in human MDA-MB-231, murine 4T1.2 and B16F10 tumor cells. Scant internalization by 3T3L1 cells is observed (white arrows). (FIG. 3C) Quantification of Bio-HK-BLMP6 internalization as NFI (center) and percentage (right). (FIG. 3D) Trypan blue exclusion assay to detect cell death 8 hours after HK-BLMP6 (0.1 mM) treatment (left). Enumeration of trypan blue-positive cells (right). 4T1, B16F10 and MDA-MB-231 tumor cell lines incur significant levels of cell death unlike 3T3L1 cells. For all cases, data represented as mean±S.E.M. of 5 individual microscopic fields of view. Error bars: *, $p \leq 0.001$; **, $p \leq 0.0001$ (Tukey's multiple comparisons test). Scale bar: 50 μm.

FIG. 4A-C depict BLMP6 selectivity for mesenchymal cancer cells. (FIG. 4A) $10^{10}$ TU BLMP6-Phage was intravenously injected into mice bearing pulmonary metastases. Co-localization of BLMP6-Phage (red) visualized by immunofluorescence. Observed is BLMP6-Phage co-localization (yellow arrows) with N-Cadherin-expressing tumor cells (green) in both 4T1.2 (top, left) and B16F10 (top, right) murine models. No selectivity (white arrows) for E-Cadherin-positive cancer cells (green) in either 4T1.2 (bottom, left) or B16F10 (bottom, right) murine models. (FIG. 4B) Quantification of BLMP6-Phage co-localization with E-Cadherin and N-Cadherin in 4T1.2 and B16F10 murine models. Quantification of BLMP6-Phage or Bio-HK-BLMP6 (red) spatial overlap with E-cadherin or N-Cadherin (green) is defined by Mander's Coefficient tabulated from RGB images captured at least four random projections. (FIG. 4C) Immunofluorescence analysis of BLMP6-Phage (red) or Bio-HK-BLMP6 (red) co-localization with E-cadherin expressing (green) 4T1.2, 4T1.2 CTX (cisplatin-resistant), B16F10 or MDA-MB-231 cell lines in vitro. Both BLMP6-Phage (top) and Bio-HK-BLMP6 (bottom) home to cells with reduced E-cadherin expression (white arrows). Cells with increased E-cadherin expression (green arrows) demonstrate reduced BLMP6-Phage (top) or Bio-HK-BLMP6 (bottom) internalization. For all cases, data are represented as mean±S.E.M. Error bars: ns=non-significant; ****, $p \leq 0.0001$ (Tukey's multiple comparisons test). Nuclear staining is blue. Scale bar: 50 μm.

FIGS. 5A-D illustrate a screen for lung metastatic tumor cell-homing peptides. A, Anti-phage immunofluorescence (red) in 3T3L1 preadipocytes versus murine 4T1.2 and B16F10 tumor cell lines incubated with control insert-less phage 8 over hours. Digital merging reveals no cellular internalization. B, Normalized Fluorescence Intensity (NFI) used to quantify the amount of BLMP5-Phage and BLMP6-Phage binding to the cell surface. The means±S.E.M. of 5 individual microscopic fields of view are graphed. C, Quantification of cell percentage demonstrating either BLMP5-Phage or BLMP6-Phage binding. Represented are the means±S.E.M. of 5 individual microscopic fields of view. D, Quantification of individual phage-peptide clone binding efficiency to MDA-MB-231 cells. Error bars: ns=not significant; *, $p<0.001$; **, $p<0.0001$ (Tukey's multiple comparisons test). Nuclear staining is blue. Scale bars, 50 μm.

FIGS. 6A-D illustrate that BLMP6 exhibits specificity for pulmonary metastases. (FIG. 6A and FIG. 6B) Anti-phage immunofluorescence (red) to analyze pulmonary tropism of intravenously administered phage-displayed peptide clones and peptide-free phage (1010) TU into mice. After 3 hours of circulation, (FIG. 6A) insert-less phage exhibits no localization in pulmonary metastases and control organs in the 4T1 murine model. Phage trapping by liver is observed. (FIG. 6B) No localization of BLMP5-Phage (top) and BLMP6-Phage (bottom) in normal lung (NL) free of metastatic lesions. Non-specific phage trapping is observed in liver. (FIG. 6C and FIG. 6D) Biodistribution studies for 67Ga-labelled peptide uptake in vivo. Radioactive uptake presented as mean % ID/g. High uptake of radiolabeled peptides observed in the kidneys. (FIG. 6C) Reduced uptake of 67Ga-DOTA is observed in pulmonary metastases bearing mice. (FIG. 6D) Reduced uptake of 67Ga-BLMP5 and 67Ga-BLMP5 in lungs of wild-type mice. Error bars: ****, $p<0.0001$ (Tukey's multiple comparisons test). Nuclear staining is blue. Scale bars, 50 μm.

FIGS. 7A-D illustrate that Hunter-killer BLMP5 (HK-BLMP5) induces cell death. (FIG. 7A) Visualization of biotinylated HK-BLMP5 (Bio-HK-BLMP5) internalization by 3T3L1, MDA-MB-231, 4T1.2 and B16F10 cells with streptavidin-Cy3 (left). Nuclear staining is blue. Quantification of biotinylated HK-BLMP5 cell surface localization as NFI (center) and percentage (right). (FIG. 7B) Corroboration of HK-BLMP6 induced apoptosis via anti cleaved caspase-3 immunofluorescence (red). (FIG. 7C) Quantification of uncoupled (KLAKLAK)$_2$ (SEQ ID NO: 13) induced cell death through enumeration of trypan blue-positive cells. (FIG. 7D) Trypan blue exclusion assay to detect cell death 24 hours after treatment with 0.1 mmol/l uncoupled (KLAKLAK)2 2 (SEQ ID NO: 13) (top) or 0.03 mmol/l HK-BLMP5 (bottom). For all cases, data represented as means±S.E.M. of 5 individual microscopic fields of view. Error bars: ns=not significant; *, $p<0.05$; ***, $p<0.001$ (Tukey's multiple comparisons test). Scale bar: 50 μm.

FIGS. 8A-D illustrate that BLMP5-Phage demonstrates selectivity for N-Cadherin-expressing mesenchymal tumor cells both in vivo and in culture. (FIG. 8A) 1010 TU BLMP5-Phage was intravenously injected into mice bearing pulmonary metastases. Co-localization of BLMP5-Phage (red) visualized via IFA. BLMP5-Phage co-localization (orange arrows) with N-Cadherin-expressing tumor cells (green) in 4T1 murine model is observed. No homing (white arrows) to E-Cadherin-positive tumor cells (green). (FIG. 8B) IFA to visualize BLMP5-Phage (red) co-localization with E-cadherin-expressing (green) 4T1.2 and B6F10 cell lines in vitro. BLMP5-Phage homes to cells with reduced E-cadherin expression (white arrows). Cells with increased E-cadherin expression (green arrows) demonstrate reduced BLMP5-Phage localization. (FIG. 8C) Quantification of BLMP5-Phage (red) co-localization with E-Cadherin (green) or N-Cadherin (green) expressing cells in vivo. (FIG. 8D) Quantification of BLMP5-Phage (red) co-localization with E-Cadherin (green) in cell culture. (FIG. 8C and FIG. 8D) Quantification of BLMP5-Phage (red) spatial overlap with E-cadherin or N-Cadherin (green) is defined by Mander's Coefficient tabulated from RGB images captured at a minimum of four different microscopic fields. For all cases, data is represented as mean±S.E.M. Error bars: ns=non-significant; p≤0.01; **, p≤0.0001 (Tukey's multiple comparisons test). Nuclear staining is blue. Scale bars, 50 μm.

BRIEF DESCRIPTION OF THE SEQUENCES LISTED

The sequences listed below provides amino acid sequences of BLMP peptides some of which bind mammalian metastatic cancer tissue. The amino acid sequences of cysteine-cyclized peptides, BLMP 1-6 (SEQ ID NOS: 1-6) and nucleic acid sequences encoding these peptides are shown in SEQ ID NOS: 7-12, some of which bind selectively to metastatic cancer tissue. SEQ ID NOS: 13-19 are the amino acid sequences of apoptosis-inducing cytotoxic peptides.

```
>BLMP6
                                       SEQ ID NO: 1
CRAGVGRGC

>BLMP5
                                       SEQ ID NO: 2
CLRHSSKIC

>BLMP4
                                       SEQ ID NO: 3
CHLSFSTAC

>BLMP3
                                       SEQ ID NO: 4
CEGPMYAKC

>BLMP2
                                       SEQ ID NO: 5
CSGVGIASC

>BLMP1
                                       SEQ ID NO: 6
CGVLPYSLC

>BLMP6 nucleic acid sequence
                                       SEQ ID NO: 7
TGCAGGGCCGGCGTGGGCAGGGGCTGC >BLMP5 nucleic acid sequence
                                       SEQ ID NO: 8
GCCTGAGGCACAGCAGCAAGATCTGC >BLMP4 nucleic acid sequence
                                       SEQ ID NO: 9
TGCCACCTGAGCTTCAGCACCGCCTGC >BLMP3 nucleic acid sequence
                                       SEQ ID NO: 10
TGCGAGGGCCCCATGTACGCCAAGTGC >BLMP2 nucleic acid sequence
                                       SEQ ID NO: 11
TGCAGCGGCGTGGGCATCGCCAGCTGC >BLMP1 nucleic acid sequence
                                       SEQ ID NO: 12
TGCGGCGTGCTGCCCTACAGCCTGTGC >(KLAKLAK)2 cytotoxic peptide
                                       SEQ ID NO: 13
Lys Leu Ala Lys Leu Ala Lys Lys Leu Ala Lys Leu
Ala Lys >(KLAKKLA)2 cytotoxic peptide
                                       SEQ ID NO: 14
Lys Leu Ala Lys Lys Leu Ala Lys Leu Ala Lys Lys
Leu Ala >(KAAKKAA)2 cytotoxic peptide
                                       SEQ ID NO: 15
Lys Ala Ala Lys Lys Ala Ala Lys Ala Ala Lys Lys
Ala Ala >(KLGKKLG)3 cytotoxic peptide
                                       SEQ ID NO: 16
Lys Leu Gly Lys Lys Leu Gly Lys Leu Gly Lys Lys
Leu Gly Lys Leu Gly Lys Lys Leu Gly >(KFAKFAK)2 cytotoxic peptide
                                       SEQ ID NO: 17

>(KFXAKFXAK)2 cytotoxic peptide
                                       SEQ ID NO: 18

>(KHexAKHexAK)2(KLAKLAK)2 cytotoxic peptide
                                       SEQ ID NO: 19
```

DETAILED DESCRIPTION

A. Definitions

In this disclosure, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements and components comprising one unit and elements or components that comprise more than one unit unless specifically stated otherwise.

The section headings used herein are for organizational purposes only and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

As used herein, and unless otherwise indicated, the term cancer cells in metastases, include but are not limited to metastatic carcinoma cells that have undergone epithelial to mesenchymal transition (EMT). Included are term cancer cells in metastases that are resistant to current therapies, including chemotherapies, radiotherapies and immunotherapies, among others.

Such cells include, but are not limited to, those of lung carcinomas; breast carcinomas; melanomas, as well as other solid tumors.

As used herein, and unless otherwise indicated, the terms "treat," "treating," "treatment" and "therapy" contemplate an action that occurs while a patient is suffering from a cancer in metastases, or symptoms associated with metastatic tumor cells. Such a treatment may reduce the size of metastatic tumor, metastatic tumor cell numbers or severity of one or more symptoms or effects associated with metastatic tumor cells.

As used herein, and unless otherwise indicated, the terms "prevent," "preventing," and "prevention" contemplate an action that occurs before a patient begins to suffer from an metastatic tumor cell associated disorder.

As used herein, and unless otherwise indicated, the terms "manage," "managing," and "management" encompass preventing, delaying, or reducing the severity of a recurrence of an metastatic tumor cell associated disorder. in a patient who has already suffered from such a disease, disorder or condition. The terms encompass modulating the threshold, development, and/or duration of the metastatic tumor cell associated disorder or changing how a patient responds to the metastatic tumor cell associated disorder.

As used herein, and unless otherwise specified, a "therapeutically effective amount" of a compound is an amount sufficient to provide any therapeutic benefit in the treatment or management metastatic tumor cell associated disorders. A therapeutically effective amount of a compound or agent means an amount of the compound, alone or in combination with one or more other therapies and/or therapeutic agents that provide any therapeutic benefit in the treatment or management of cancer cells in metastases. The term "therapeutically effective amount" can encompass an amount that alleviates symptoms associated with cancer cells in metastases, the size or number of metastatic cancer cells, improves overall therapy, or enhances the therapeutic efficacy of another therapeutic agent.

As used herein, and unless otherwise specified, a "prophylactically effective amount" of a compound is an amount sufficient to prevent or delay the onset of a metastatic tumor cell associated disorder or one or more symptoms associated metastatic tumor cells, or prevent or delay its recurrence or further spread. A prophylactically effective amount of a compound means an amount of the compound, alone or in combination with one or more other treatment and/or prophylactic agent that provides a prophylactic benefit in the prevention of a metastatic tumor cell associated disorder. The term "prophylactically effective amount" can encompass an amount that prevents metastatic tumor cell associated disorder, improves overall prophylaxis, or enhances the prophylactic efficacy of another prophylactic agent. The "prophylactically effective amount" can be prescribed prior to, for example, the development of metastatic tumor cell tissue associated disorder or the development of additional metastasis.

As used herein, "patient" or "subject" includes organisms which are capable of suffering from a metastatic tumor cell tissue associated disorder, as described herein, such as human and non-human animals. Preferred human animals include human subjects. The term "non-human mammals" as used herein includes all mammals, e.g., rodents, mice, rats, etc. and non-human primates, companion animals and livestock, e.g., sheep, dog, cow, horse, etc.

As used herein, a "targeting peptide" is a peptide comprising a contiguous sequence of amino acids, which is characterized by selective localization to an organ, tissue or cell type. Selective localization may be determined, for example, by methods disclosed below, wherein the putative targeting peptide sequence is incorporated into a protein that is displayed on the outer surface of a phage. Administration to a subject of a library of such phage that have been genetically engineered to express a multitude of such targeting peptides of different amino acid sequence is followed by collection of one or more organs, tissues or cell types from the subject and identification of phage found in that organ, tissue or cell type. A phage expressing a targeting peptide sequence is considered to be selectively localized to a tissue or organ if it exhibits greater binding in that tissue or organ compared to a control tissue or organ. Preferably, selective localization of a targeting peptide should result in a two-fold or higher enrichment of the phage in the target organ, tissue or cell type, compared to a control organ, tissue or cell type. Selective localization resulting in at least a three-fold, four-fold, five-fold, six-fold, seven-fold, eight-fold, nine-fold, ten-fold or higher enrichment in the target organ compared to a control organ, tissue or cell type is more preferred. Alternatively, a phage expressing a targeting peptide sequence that exhibits selective localization preferably shows an increased enrichment in the target organ compared to a control organ when phage recovered from the target organ are re-injected into a second host for another round of screening. Further enrichment may be exhibited following a third round of screening. Another alternative means to determine selective localization is that phage expressing the putative target peptide preferably exhibit a two-fold, more preferably a three-fold or higher enrichment in the target organ compared to control phage that express a non-specific peptide or that have not been genetically engineered to express any putative target peptides. "Targeting peptide" and "homing peptide" are used synonymously herein.

As used herein "phage display library" means a collection of phage that have been genetically engineered to express a set of putative targeting peptides on their outer surface. In preferred embodiments, DNA sequences encoding the putative targeting peptides are inserted in frame into a gene encoding a phage capsule protein. In other preferred embodiments, the putative targeting peptide sequences are in part random mixtures of all twenty amino acids and in part non-random. In certain preferred embodiments the putative targeting peptides of the phage display library exhibit one or more cysteine residues at fixed locations within the targeting peptide sequence. Cysteines may be used, for example, to create a cyclic peptide.

A "macromolecular complex" refers to a collection of molecules that may be random, ordered or partially ordered in their arrangement. The term encompasses biological organisms such as bacteriophage, viruses, bacteria, unicellular pathogenic organisms, multicellular pathogenic organisms and prokaryotic or eukaryotic cells. The term also encompasses non-living assemblages of molecules, such as liposomes, microcapsules, microparticles, nanoparticles, magnetic beads and microdevices. The only requirement is that the complex contains more than one molecule. The molecules may be identical, or may differ from each other.

A "receptor" for a targeting peptide includes but is not limited to any molecule or macromolecular complex that binds to a targeting peptide. Non-limiting examples of receptors include peptides, proteins, glycoproteins, lipoproteins, epitopes, lipids, carbohydrates, multi-molecular structures, a specific conformation of one or more molecules and a morphoanatomic entity. In preferred embodiments, a "receptor" is a naturally occurring molecule or complex of molecules that is present on the lumenal surface of cells forming blood vessels within a target organ, tissue or cell type.

B. Embodiments

Compositions and methods are provided for use in generating selective targeting peptides. In some embodiments, particular targeting peptides selective or specific for metastatic tumor cell tissue, are provided in BLMP 6 (SEQ ID NO:1: CRAGVGRGC), BLMP 5 (SEQ ID NO:2: CLRHSSKIC), BLMP 4 (SEQ ID NO:3: CHLSFSTAC), BLMP3 (SEQ ID NO:4: CEGPMYAKC), BLMP 2 (SEQ ID NO:5: CSGVGIASC) and BLMP 1 (SEQ ID NO:6: CGVLPYSLC). BLMP 1-6 were selected based on the ability to home to chemotherapy-resistant 4T1.2 metastases which represent highly metastatic breast cancer cells. BLMP 1-6 were validated based on the ability to home to 4T1.2 metastases (irrespective of chemotherapy-resistance). BLMP5 and BLMP6 were selective for cells undergoing EMT (E-Cadherin−/N-Cadherin+) in both primary tumors and metastases. BLMP5 did not home to melanoma metastases in a mouse model and was less effective ex vivo than BLMP6, which was validated in all assays and homed to various metastases in the mouse melanoma model and it was effective both ex vivo and in vivo as hunter killer conjugate. In still other embodiments, targeting peptides selective for metastatic tumor cell tissue may be used to selectively or specifically deliver therapeutic agents to target tissues, such as metastatic tumor cell tissue. In certain embodiments, the methods concern the preparation and identification of targeting peptides selective or specific for a given target cell, tissue, or organ, such as metastatic tumor cell.

Metastatic progression to therapy-resistant stages remains the overriding cause of cancer-associated mortalities. Metastasis from primary carcinomas is mediated by a hierarchical series of events. The ability of tumors to survive therapy directed at primary tumors and invade other tissues is rooted in the phenotypic plasticity of cancer cells (Ganesh and Massague, 2021). The latent developmental program of epithelial to mesenchymal transition (EMT) underlies the plasticity of carcinomas cells (Kalluri and Weinberg, 2009). EMT encompasses the continuum of morphological and genomic transitions observed during carcinoma progression (Yang et al., 2020). Besides exacerbating the invasive, migratory and metastatic potential of cancer cells at the invasive tumor front, the EMT endows malignant cells with therapy-resistance properties (Aware et al., 2015; Thomas and Grandis, 2011). Currently, there are no effective approaches for early detection of these cells in tumors. Development of imaging probes for mesenchymal cancer cells would enable timely detection of aggressive and metastatic cancers. Such probes could also lead to new therapeutic strategies to target these aggressive cancer cells, which could improve patient outcomes.

The inventors have established expertise in identifying probes binding to cell-surface receptors expressed on cell populations of interest (Arap et al., 2002). Through in vivo screening of combinatorial libraries, cell-targeting peptides were isolated which have been used for targeted delivery of experimental therapeutics in vivo (Daquinag et al., 2016). Bimodal 'hunter-killer' peptides, composed of a cytotoxic pro-apoptotic domain conjugated to a cell surface receptor-binding domain, have been used by the inventors' group for targeted cell ablation (Daquinage et al., 2015). Here, a screen of phage-displayed peptide libraries was conducted in an orthotopic mouse model of spontaneous chemotherapy-resistant breast cancer. Identified herein are two exemplary heptameric cyclic peptides homing to spontaneous pulmonary metastases of breast tumors in a mouse model. These peptides have been labelled Breast Lung Metastasis-homing Peptides (BLMPs). The use of BLMP6 for metastasis detection was demonstrated in an experimental model of melanoma cell dissemination using a radiolabeled analog. BLMP6 conjugated with an apoptosis-inducing moiety was also shown to selectively kill cancer cells. The findings indicate BLMP homing to cells undergoing EMT. Described is the combination of phage display in vivo technology (such as that described in, among other places, US Patent Applications US20090104117, US20060094672, US20060239968, US20090221505, US20080176792, US20080124277, US20100172864, US20040170955, US20010046498 and Kolonin et al., Nature Medicine; 10, 625-32, 2004) with fluorescence-activated cell sorting (FACS) for isolation of peptides homing to selective populations of cells in an organ of interest. This in vivo selection system was used in combination with phage display libraries to identify organ, tissue or cell type-targeting peptides. Phage display libraries expressing transgenic peptides on the surface of bacteriophage can be generated by inserting random oligonucleotides into cDNAs encoding a phage surface protein, generating collections of phage particles displaying unique peptides in many permutations. Phage display is a technique in which a phage library expresses, for example, a set of random peptide sequences of defined length, incorporated into a phage coat protein and peptide sequences that bind to a target molecule, cell, tissue, for example metastatic tumor cell tissue or organ were identified by incubating a phage display library with the target and selecting for bound peptides Unbound phage is washed away and bound phage eluted and collected. The collected phage may be amplified and taken through further binding/amplification cycles to enrich the pool of peptides for those that selectively and/or specifically bind to the target. With each cycle, the proportion of phage in the pool that contains targeting peptides for the target of interest is enriched. After several cycles, individual phage clones may be characterized by DNA sequencing to identify the targeting peptide sequences (biopanning, see for example, US20050187161 as well as Pasqualini and Ruoslahti, Nature 380:364-66, 1996; Arap et al., Science 279:377-80, 1998).

Intravenous (I.V.) administration of phage display libraries to mice was followed by the recovery of phage from individual organs. Phage were recovered that were capable of selective homing to metastatic tumor cell tissue, based on the specific targeting peptide sequences expressed on the outer surface of the phage. A variety of organ and tumor-homing peptides have been identified by this method (see for example U.S. patent publications: US20060094672, US20080124277, US20090104117, US20090221505 and US20100172864).

The use of peptides as targeting peptides and to generate for example in vivo cell targeting hybrid peptides coupled to pro-apoptotic hybrid peptides that exhibit selective and/or specific binding of target tissue including, but not limited to, metastatic tumor cell tissues have been previously reported (see for example US Patent Application Publications US20090104117, US20060094672, US20060239968, US20090221505, US20080176792, US20080124277 and US20100172864). Such hybrid peptides are synthesized peptides composed of two functional domains: a homing (cell targeting) domain that binds to a receptor differentially expressed on cells of interest and a cytotoxic domain that causes apoptotic death of cells that internalize the peptide. The homing peptide is typically 7 to 8 amino acids long and is cyclic (constrained by two disulfide-bonded cysteines). The cytotoxic domain is an amphipatic peptide sequence KLAKLAKKLAKLAK (SEQ ID NO: 13) designated (KLAKLAK)$_2$ (SEQ ID NO: 13), which disrupts mitochondrial membranes upon receptor-mediated cell internalization and causes programmed cell death (apoptosis). Such cytotoxic peptides also include, those comprising those having the formula of (FXR)n, where n=4, 6, 8 and 10, and here F is phenylalanine, FX is cyclohexyl-alanine and Hex is 6-carbon alkyl chain residue, examples being (KFAKFAK)$_2$ (SEQ ID NO: 17), (KFXAKFXAK)$_2$ (SEQ ID NO: 18) and (KHexAKHexAK)$_2$ (SEQ ID NO: 19) as well as those described, for example in, Horton, K L and Kelley, S O., *J. Med. Chem.* 52, 3293-3299, 2009; Yousif, L. F., Stewart, K. M., Horton, K. L and Kelley. S. O., *ChemBioChem*, 10: 2081-2088, 2009; Kelley S O, Stewart K M, Mourtada R., *Pharm Res.* November; 28(11):2808-19, 2011. Epub 2011 Aug. 11; Horton, K L, Pereiral, M P, Stewart, K M, Fonseca S B and Kelley, S O., *ChemBioChem,* 13(3), 476-485, 2012. Published online: 11 Jan. 2012.

However, the success of these hybrid peptides has been previously limited, and may be associated with toxicity, because the homing domain and the published Gly-Gly linker have traditionally been composed of L-amino acids which can be subject to proteolysis in vivo. Proteolysis reduces the active hybrid peptide and can eventually result in the release of various sub-peptides, some of which may represent the targeting or effector portions of the hybrid peptide. The possible release of the effector peptides, such as but not limited to pro-apoptotic peptides, such as $_D$KLAK-LAK$_2$ (SEQ ID NO: 20), without the targeting peptides, may lead to adverse reactions such as kidney toxicity. In addition, instability due to proteolysis, increases the amount of peptide necessary for injection to obtain therapeutic levels. Therefore, the clinical efficacy and safety of effector peptides of the prior art is limited.

Further, because the glycines composing the earlier described linker region do not exist as a D-form, synthesis of an all-D pro-apoptotic peptide was not been previously possible until the replacement of the linker with aminohexanoic acid, as described herein. In addition, construction of a homing/targeting peptide domain from D-form amino acids has not been previously attempted due to a concern that conversion from L-form (in which the peptides are originally isolated) to D-form may result in conformational change that results in incompatiblity with the target receptor and loss of recognition, and a corresponding loss of homing. However, as described herein such all-D peptides can home to target cells as well as the L peptides of the prior art.

In some embodiments, a composition includes an isolated peptide comprising a amino acid sequence selected from the group consisting of SEQ ID NOS: 1-6, wherein the peptide binds to metastatic tumor cells. In some embodiments, a protein composition comprises an amino acid sequence selected from the group consisting of BLMP1-6: SEQ ID NOS: 1-6, and in some embodiments, the protein composition is composed entirely of D-amino acids. In some other embodiments, a protein composition comprises a peptide coupled to an imaging agent. In some embodiments, the targeting peptide is coupled to cytotoxic or pro-apoptotic agent. In some embodiments, a protein composition comprises a peptide that selectively binds metastatic tumor cell tissue coupled to an agent. In some embodiments, the peptides are composed of D-amino acids. In some embodiments, the peptides are coupled to the agents or other peptides through a linker. In some embodiments the linker comprises aminohexanoic acid. In some embodiments the linker comprises $(CH_2)_4$; $(CH_2)_5$; $(CH_2)_6$; $(CH_2)_7$; $(CH_2)_8$ or a combination thereof. In some embodiments, the agent is a peptide described herein and, in some embodiments, the peptide is composed of D-amino acids. In some embodiments, the peptides are composed of D-amino acids. In some embodiments, the peptides are coupled to the agents or other peptides through a linker. In some embodiments the linker comprises aminohexanoic acid.

In some other embodiments, an isolated nucleic acid composition comprises a nucleotide sequence that encodes an amino acid sequence selected from the group consisting of BLMP1-6: SEQ ID NOS: 1-6. In some embodiments, a recombinant host cell comprises the isolated nucleic acid molecule, and in some additional embodiments, an expression vector comprises the isolated nucleic acid molecule. In some embodiments, a host cell comprises the expression vector.

In some embodiments, the disclosed peptides can be linked to at least one agent to form an peptide conjugate. In order to increase the efficacy of peptide molecules as diagnostic, prognostic or therapeutic agents, it is conventional to link or covalently bind or complex at least one desired molecule or moiety. Such a molecule or moiety can be, but is not limited to, at least one effector or reporter molecule. Effector molecules comprise molecules having a desired activity, e.g., cytotoxic activity. Non-limiting examples of effector molecules which can be attached to peptides include toxins, anti-tumor agents, therapeutic enzymes, radionuclides, antiviral agents, chelating agents, cytokines, growth factors, and oligo- or polynucleotides. By contrast, a reporter molecule is defined as any moiety which can be detected using an assay. Non-limiting examples of reporter molecules which have been conjugated to antibodies include enzymes, radiolabels, haptens, fluorescent labels, phosphorescent molecules, chemiluminescent molecules, chromophores, photoaffinity molecules, colored particles or ligands, such as biotin.

Peptide conjugates can also be used as diagnostic or prognostic agents. Peptide based diagnostics or prognostics include those for use in in vitro diagnostics, and those for use in vivo diagnostic protocols, generally known as "peptide-directed imaging." The imaging moieties used can be paramagnetic ions, radioactive isotopes, fluorochromes, NMR-detectable substances, and X-ray imaging agents produced according to well-known methods in the art.

In some embodiments, a method of delivering a cytotoxic, apoptotic, transdevelopmental or imaging peptide to metastatic tumor cell tissue comprises (a) coupling to a targeting peptide having an amino acid sequence selected from the group consisting of BLMP1-6: SEQ ID NOS: 1-6, wherein the targeting peptide selectively binds metastatic tumor cells. In some embodiments the peptides are composed of D-amino acids. In some embodiments, the peptides are coupled through a linker peptide and in some embodiments the linker comprises aminohexanoic acid.

In some other embodiments, a method of delivering a compound or agent to a metastatic tumor cell tissue comprises: a) obtaining a peptide that selectively binds to metastatic tumor cell tissue, wherein the peptide is less than 100 amino acids in length and includes an metastatic tumor cell tissue targeting motif having an amino acid sequence selected from the group consisting of SEQ ID NOS: 1-6, wherein the peptide is coupled to the compound or agent that one desires to target to metastatic tumor cell tissue; and b)

exposing the peptide to a population of cells suspected of containing metastatic tumor cell tissue. In some embodiments, the peptide comprises a linker. In some embodiments the peptide is composed of D-amino acids. In some embodiments, both the peptide and the agent are composed of D-amino acids. In some embodiments, the coupling occurs through a linker peptide and in some embodiments the linker comprises aminohexanoic acid. In some embodiments, the agent comprises a cytotoxic or pro-apoptotic peptide. In some embodiments, the agent comprises is an imaging agent. In some embodiments, (b) comprises, exposing a subject to the peptide to treat an metastatic tumor cell associated disorder. In some embodiments the population of cells is in a human subject. In some embodiments, the population of cells is a thin section of a tissue. In other embodiments, the method further comprises detecting metastatic tumor cell stem cells in said population.

In other embodiments, is an isolated peptide comprising a amino acid sequence selected from the group consisting of BLMP1-6: SEQ ID NOS: 1-6, and wherein said peptide binds to lung tissue. In some embodiments, a protein composition comprising an amino acid sequence selected from the group consisting of BLMP1-6: SEQ ID NOS: 1-6 and in some embodiments, the protein composition is composed entirely of D-amino acids. In other embodiments, is the protein composition wherein the peptide is coupled to an imaging agent. In some embodiments, the protein composition wherein the peptide is coupled to cytotoxic or pro-apoptotic agent. In some embodiments, the peptide is composed of D-amino acids. In some embodiments, the coupling occurs through a linker peptide and in some embodiments the linker comprises aminohexanoic acid.

In an exemplary composition of the chimeric cytotoxic peptide composition, all amino acids in both domains has been constructed of D-enantiomers, and thus resistant to proteolysis in vivo, allowing long-term effects of the peptide upon systemic administration. The linker connecting the two domains is aminohexanoic acid (Ahx): NH—$(CH_2)_5$—CO, which is also not subject to cleavage by proteases in vivo. For use in the examples below, chimeric peptide was produced commercially (e.g., by Anaspec, Bachem, or Celtek) and synthesized by conventional peptide chemistry ("Merrifield synthesis").

In certain embodiments, alternative therapeutic agents may be attached to a targeting peptide or fusion protein for selective delivery to metastatic tumor cell tissue. Agents or factors suitable for use may include any chemical compound that induces apoptosis, cell death, cell stasis and/or anti-angiogenesis. Apoptosis, or programmed cell death, is an essential process for normal embryonic development, maintaining homeostasis in adult tissues, and suppressing carcinogenesis. Examples of the coupling and use of such peptides include but are not limited to US Patent Applications US20090104117, US20060094672, US20060239968, US20090221505, US20080176792 and US20080124277. Non-limiting examples of pro-apoptosis agents contemplated within the scope of the disclosure include gramicidin, magainin, mellitin, defensin, cecropin, $(KLAKLAK)_2$ (SEQ ID NO: 13), $(KLAKKLA)_2$ (SEQ ID NO: 14), $(KAAKKAA)_2$ (SEQ ID NO: 15) or $(KLGKKLG)_3$ (SEQ ID NO: 16).

In certain embodiments included is the administration of targeting peptides attached to anti-angiogenic agents, such as angiotensin, laminin peptides, fibronectin peptides, plasminogen activator inhibitors, tissue metalloproteinase inhibitors, interferons, interleukin 12, platelet factor 4, IP-10, Gro-β, thrombospondin, 2-methoxyoestradiol, proliferin-related protein, carboxiamidotriazole, CM101, Marimastat, pentosan polysulphate, angiopoietin 2 (Regeneron), interferon-alpha, herbimycin A, PNU145156E, 16K prolactin fragment, Linomide, thalidomide, pentoxifylline, genistein, TNP470, endostatin, paclitaxel, accutin, angiostatin, cidofovir, vincristine, bleomycin, AGM-1470, platelet factor 4 or minocycline.

In certain embodiments administration of targeting peptides attached to cytotoxic agents. Such cytotoxic chemotherapeutic agents, include but at not limited to, 5-fluorouracil, bleomycin, busulfan, camptothecin, carboplatin, chlorambucil, cisplatin (CDDP), cyclophosphamide, dactinomycin, daunorubicin, doxorubicin, estrogen receptor binding agents, etoposide (VP16), farnesyl-protein transferase inhibitors, gemcitabine, ifosfamide, mechlorethamine, melphalan, mitomycin, navelbine, nitrosurea, plicomycin, procarbazine, raloxifene, tamoxifen, taxol, temazolomide (an aqueous form of DTIC), transplatinum, vinblastine and methotrexate, vincristine, or any analog or derivative variant of the foregoing. Most chemotherapeutic agents fall into the categories of alkylating agents, antimetabolites, antitumor antibiotics, corticosteroid hormones, mitotic inhibitors, and nitrosoureas, hormone agents, natural products, miscellaneous agents, and any analog or derivative variant thereof.

Natural products generally refer to compounds originally isolated from a natural source, and identified as having a pharmacological activity. Such compounds, analogs and derivatives thereof may be, isolated from a natural source, chemically synthesized or recombinantly produced by any technique known to those of skill in the art. Natural products include such categories as mitotic inhibitors, antitumor antibiotics, enzymes and biological response modifiers. Examples, of such natural products, include but are not limited to, plant alkaloids and other natural agents that can inhibit either protein synthesis required for cell division or mitosis, such as but not limited to docetaxel, etoposide (VP16), teniposide, paclitaxel, taxol, vinblastine, vincristine, and vinorelbine.

Chemotherapeutic agents and methods of administration, dosages, etc. are well known to those of skill in the art (see for example, the "Physician's Desk Reference", Goodman & Gilman's "The Pharmacological Basis of Therapeutics" and in "Remington's Pharmaceutical Sciences" 15th ed., pp 1035-1038 and 1570-1580, incorporated herein by reference in relevant parts), and may be combined with the disclosed compositions in light of the disclosures herein. Some variation in dosage will necessarily occur depending on the condition of the subject being treated. The person responsible for administration will, in any event, determine the appropriate dose for the individual subject. Examples of specific chemotherapeutic agents and dose regimes are also described herein. Of course, all of these dosages and agents described herein are exemplary rather than limiting, and other doses or agents may be used by a skilled artisan for a specific patient or application. Any dosage in-between these points, or range derivable therein is also expected to be included in certain embodiments.

In some embodiments, disclosed peptides or proteins may be attached to imaging agents of use for imaging and diagnosis of various diseased organs, tissues or cell types. The peptide or protein is labeled or conjugated with a fluorophore or radiotracer for use as an imaging agent. Many appropriate imaging agents are known in the art, as are methods for their attachment to proteins or peptides using metal chelate complexes, radioisotopes, fluorescent markers, or enzymes whose presence can be detected using a colorimetric markers (such as, but not limited to, urease, alkaline phosphatase, (horseradish) hydrogen peroxidase and glucose oxidase).

In some embodiments, the imaging conjugate will also be dual labeled with a radio-isotope in order to combine imaging through nuclear approaches and be made into a unique cyclic structure and optimized for binding affinity and pharmacokinetics. Such agents can be administered by any number of methods known to those of ordinary skill in the art including, but not limited to, oral administration, inhalation, subcutaneous (sub-q), intravenous (I.V.), intraperitoneal (I.P.), intramuscular (I.M.), or intrathecal injection, or as described in greater detail below. In some embodiments the methods and compositions described herein can be used alone or in combination with other techniques, to diagnose access and monitor and direct therapy of metastatic tumor cell associated disorders.

In some embodiments, targeting peptides can be used to direct the delivery of non-living assemblages of molecules, such as liposomes, microcapsules, microparticles, nanoparticles, magnetic beads and microdevices, alone or in combination, containing or coupled with antibiotics that have both antimicrobial and cytotoxic activity, including, but not limited to, bleomycin, dactinomycin, daunorubicin, doxorubicin (Adriamycin), plicamycin (mithramycin) and idarubicin. Additional types of cytotoxic agents that could be delivered using the disclosed targeting peptides include, but are not limited to, platinum coordination complexes, anthracenediones, substituted ureas, methyl hydrazine derivatives, amsacrine, L-asparaginase, and tretinoin. Platinum coordination complexes include such compounds as carboplatin and cisplatin (cis-DDP). An exemplary anthracenedione is mitoxantrone. An exemplary substituted urea is hydroxyurea. An exemplary methyl hydrazine derivative is procarbazine (N-methylhydrazine, MIH). These examples are not limiting and it is contemplated that any known cytotoxic, cytostatic or cytocidal agent may be attached to the presently disclosed targeting peptides and administered to a targeted organ, tissue or cell type. The desired targeting, cytotoxic or hybrid peptide amino acid sequences that can be used in various embodiments including the amino acid sequences described herein, as well as analogues and derivatives thereof. In fact, in some embodiments the any desired peptide amino acid sequences encoded by particular nucleotide sequences can be used, as is the use of any polynucleotide sequences encoding all, or any portion, of desired peptide amino acid sequences. The degenerate nature of the genetic code is well-known, and, accordingly, each targeting, cytotoxic or hybrid peptide amino acid-encoding nucleotide sequence is generically representative of the well-known nucleic acid "triplet" codon, or in many cases codons, that can encode the amino acid. As such, as contemplated herein, the targeting, cytotoxic or hybrid peptide amino acid sequences described herein, when taken together with the genetic code (see, e.g., "Molecular Cell Biology", Table 4-1 at page 109 (Darnell et al., eds., W. H. Freeman & Company, New York, N.Y., 1986)), are generically representative of all the various permutations and combinations of nucleic acid sequences that can encode such amino acid sequences.

Such functionally equivalent targeting, cytotoxic, imaging or hybrid peptide amino acid sequences include, but are not limited to, additions or substitutions of amino acid residues within the amino acid sequences encoded by a nucleotide sequence, but that result in a silent change, thus producing a functionally equivalent gene product. Amino acid substitutions may be made on the basis of similarity in polarity, charge, solubility, hydrophobicity, hydrophilicity, and/or the amphipathic nature of the residues involved. For example: nonpolar (hydrophobic) amino acids include alanine, leucine, isoleucine, valine, proline, phenylalanine, tryptophan, and methionine; polar neutral amino acids include glycine, serine, threonine, cysteine, tyrosine, asparagine, and glutamine; positively charged (basic) amino acids include arginine, lysine, and histidine; and negatively charged (acidic) amino acids include aspartic acid and glutamic acid.

Amino acid substitutions may alternatively be made on the basis of the hydropathic index of amino acids. Each amino acid has been assigned a hydropathic index on the basis of its hydrophobicity and charge characteristics. They are: isoleucine (+4.5); valine (+4.2); leucine (+3.8); phenylalanine (+2.8); cysteine/cystine (+2.5); methionine (+1.9); alanine (+1.8); glycine (−0.4); threonine (−0.7); serine (−0.8); tryptophan (−0.9); tyrosine (−1.3); proline (−1.6); histidine (−3.2); glutamate (−3.5); glutamine (−3.5); aspartate (−3.5); asparagine (−3.5); lysine (−3.9); and arginine (−4.5). The use of the hydropathic amino acid index in conferring interactive biological function on a protein is understood in the art (Kyte and Doolittle, J. Mol. Biol. 157:105-132, 1982). It is known that in certain instances, certain amino acids may be substituted for other amino acids having a similar hydropathic index or score and still retain a similar biological activity. In making changes based upon the hydropathic index, in certain embodiments the substitution of amino acids whose hydropathic indices are within ±2 is included, while in other embodiments amino acid substitutions that are within ±1 are included, and in yet other embodiments amino acid substitutions within ±0.5 are included.

Amino acid substitutions may alternatively be made on the basis of hydrophilicity, particularly where the biologically functional protein or peptide thereby created is intended for use in immunological embodiments. In certain embodiments, the greatest local average hydrophilicity of a protein, as governed by the hydrophilicity of its adjacent amino acids, correlates with its immunogenicity and antigenicity, i.e., with a biological property of the protein. The following hydrophilicity values have been assigned to these amino acid residues: arginine (+3.0); lysine (+3.0); aspartate (+3.0±1); glutamate (+3.0±1); serine (+0.3); asparagine (+0.2); glutamine (+0.2); glycine (0); threonine (−0.4); proline (−0.5±1); alanine (−0.5); histidine (−0.5); cysteine (−1.0); methionine (−1.3); valine (−1.5); leucine (−1.8); isoleucine (−1.8); tyrosine (−2.3); phenylalanine (−2.5) and tryptophan (−3.4). In making changes based upon similar hydrophilicity values, in certain embodiments the substitution of amino acids whose hydrophilicity values are within ±2 is included, in certain embodiments those that are within ±1 are included, and in certain embodiments those within ±0.5 are included. One may also identify epitopes from primary amino acid sequences on the basis of hydrophilicity.

The use of fusion proteins in which a full-length polypeptide or peptide, or a truncated or mutant version of peptide is fused to an unrelated protein, polypeptide, or peptide, and can be designed on the basis of the desired peptide encoding nucleic acid and/or amino acid sequences described herein. Such fusion proteins include, but are not limited to: IgFc fusions, which stabilize proteins or peptides and prolong half-life in vivo; fusions to any amino acid sequence that allows the fusion protein to be anchored to the cell membrane; or fusions to an enzyme, fluorescent protein, or luminescent protein that provides a marker function.

In some embodiments targeting peptide might be attached to a liposome or lipid complex based delivery system. Examples of such technologies are described in "Liposomes: A Practical Approach" (Torchilin and Weissig, eds., Oxford University Press, Oxford, United Kingdom, 2003), and in U.S. Pat. Nos. 4,594,595, 5,459,127, 5,948,767 and 6,110,490.

In certain embodiments, a fusion protein may be readily purified by utilizing an antibody that selectively binds to the fusion protein being expressed. In alternate embodiments, a fusion protein may be purified by subcloning peptide encoding nucleic acid sequence into a recombination plasmid, or a portion thereof, is translationally fused to an amino-terminal (N-terminal) or carboxy-terminal (C-terminal) tag consisting of six histidine residues (a "His-tag"; see, e.g., Janknecht et al., *Proc. Natl. Acad. Sci. USA* 88:8972-8976, 1991). Extracts from cells expressing such a construct are loaded onto Ni2+ nitriloacetic acid-agarose columns, and histidine-tagged proteins are selectively eluted with imidazole-containing buffers.

While the desired peptide amino acid sequences described can be chemically synthesized (see, e.g., "Proteins: Structures and Molecular Principles" (Creighton, ed., W. H. Freeman & Company, New York, N.Y., 1984)), large polypeptides sequences may advantageously be produced by recombinant DNA technology using techniques well-known in the art for expressing nucleic acids containing a nucleic acid sequence that encodes the desired peptide. Such methods can be used to construct expression vectors containing peptide encoding nucleotide sequences and appropriate transcriptional and translational control signals. These methods include, for example, in vitro recombinant DNA techniques, synthetic techniques, and in vivo genetic recombination (see, e.g., "Molecular Cloning, A Laboratory Manual", supra, and "Current Protocols in Molecular Biology", supra). Alternatively, RNA and/or DNA encoding desired peptide encoding nucleotide sequences may be chemically synthesized using, for example, synthesizers (see, e.g., "Oligonucleotide Synthesis: A Practical Approach" (Gait, ed., IRL Press, Oxford, United Kingdom, 1984)).

A variety of host-expression vector systems may be utilized to express peptide encoding nucleotide sequences. When the desired peptide or polypeptide is soluble, or a soluble derivative, the peptide or polypeptide can be recovered from the host cell culture, i.e., from the host cell in cases where the peptide or polypeptide is not secreted, and from the culture media in cases where the peptide or polypeptide is secreted by the host cell. However, suitable expression systems also encompass engineered host cells that express the desired polypeptide, peptide or functional equivalents anchored in the cell membrane. Purification or enrichment of the desired peptide from such expression systems can be accomplished using appropriate detergents and lipid micelles, and methods well-known to those skilled in the art. Furthermore, such engineered host cells themselves may be used in situations where it is desired not only to retain the structural and functional characteristics of the peptide, but to assess biological activity, e.g., in certain drug screening assays.

In certain applications, transient expression systems are desired. However, for long-term, high-yield production of recombinant proteins or peptides, stable expression is generally preferred. For example, cell lines that stably express the desired protein, polypeptide, peptide, or fusion protein may be engineered. Rather than using expression vectors that contain viral origins of replication, host cells can be transformed with DNA controlled by appropriate expression control elements (e.g., promoter, enhancer sequences, transcription terminators, polyadenylation sites, etc.), and a selectable marker. Following the introduction of the foreign DNA, engineered cells are allowed to grow for about 1-2 days in an enriched media, and then switched to a selective media. The selectable marker in the recombinant plasmid confers resistance to the selection and allows cells to stably integrate the plasmid into their chromosomes and grow to form foci, which in turn can be cloned and expanded into cell lines. This method may advantageously be used to engineer cell lines that express the desired gene products or portions thereof. Such engineered cell lines may be particularly useful in screening and evaluation of compounds that affect the endogenous activity of the desired protein, polypeptide or peptide.

A number of selection systems may be used, including, but not limited to, the herpes simplex virus thymidine kinase (Wigler et al., *Cell* 11:223-232, 1977), hypoxanthine-guanine phosphoribosyltransferase (Szybalska and Szybalski, *Proc. Natl. Acad. Sci. USA* 48:2026-2034, 1962), and adenine phosphoribosyltransferase (Lowy et al., *Cell* 22:817-823, 1980) genes, which can be employed in tk–, hgprt– or aprt– cells, respectively. Anti-metabolite resistance can also be used as the basis of selection for the following genes: dihydrofolate reductase (dhfr), which confers resistance to methotrexate (Wigler et al., *Proc. Natl. Acad. Sci. USA* 77:3567-3570, 1980, and O'Hare et al., *Proc. Natl. Acad. Sci. USA* 78:1527-1531, 1981); guanine phosphoribosyl transferase (gpt), which confers resistance to mycophenolic acid (Mulligan and Berg, Proc. Natl. Acad. Sci. USA 78:2072-2076, 1981); neomycin phosphotransferase (neo), which confers resistance to the aminoglycoside G-418 (Colbere-Garapin et al., *J. Mol. Biol.* 150:1-14, 1981); and hygromycin B phosphotransferase (hpt), which confers resistance to hygromycin (Santerre et al., *Gene* 30:147-156, 1984).

Host cells/expression systems that may be used for purpose of providing compositions to be used in the disclosed methods include, but are not limited to, microorganisms such as bacteria (e.g., *E. coli, B. subtilis*) transformed with a recombinant bacteriophage DNA, plasmid DNA, or cosmid DNA expression vector containing a desired peptide encoding nucleotide sequence; yeast (e.g., *Saccharomyces cerevisiae, Pichia pastoris*) transformed with a recombinant yeast expression vector containing a desired peptide encoding nucleotide sequence; insect cell systems infected with a recombinant virus expression vector (e.g., baculovirus) containing a desired peptide encoding nucleotide sequence; plant cell systems infected with a recombinant virus expression vector (e.g., cauliflower mosaic virus, CaMV; tobacco mosaic virus, TMV), or transformed with a recombinant plasmid expression vector (e.g., Ti plasmid), containing a desired peptide encoding nucleotide sequence; or mammalian cell systems (e.g., COS, CHO, BHK, 293, 3T3) harboring a recombinant expression construct containing a desired peptide encoding nucleotide sequence and a promoter derived from the genome of mammalian cells (e.g., metallothionein promoter) or from mammalian viruses (e.g., the adenovirus late promoter, the vaccinia virus 7.5K promoter).

In bacterial systems, a number of different expression vectors may be advantageously selected depending upon the use intended for the desired gene product being expressed. For example, when a large quantity of such a protein is to be produced, such as for the generation of pharmaceutical compositions comprising a desired peptide, or for raising antibodies to the protein, vectors that direct the expression of high levels of fusion protein products that are readily purified may be desirable. Such vectors include, but are not limited to: the *E. coli* expression vector pUR278 (Ruther and Müller-Hill, *EMBO J.* 2:1791-1794, 1983), in which a desired peptide encoding sequence may be ligated individually into the vector in frame with the lacZ coding region so that a fusion protein is produced; pIN vectors (Inouye and Inouye, *Nucleic Acids Res.* 13:3101-3110, 1985, and Van Heeke and Schuster, *J. Biol. Chem.* 264:5503-5509, 1989); and the like. pGEX vectors (GE Healthcare, Piscataway, N.J.) may also be used to express a desired peptide moiety as a fusion protein with glutathione S-transferase (GST). In general, such fusion proteins are soluble and can easily be purified from lysed cells by adsorption to glutathione-agarose beads, followed by elution in the presence of free glutathione. The pGEX vectors are designed to include thrombin or factor Xa protease cleavage sites so that the cloned desired peptide encoding gene product can be released from the GST moiety. Because, in some embodiments, D-amino acids are preferred, methods such as those described in, among others, Park, et al., (Production of D-amino acid using whole cells of recombinant *Escherichia coli* with separately and coexpressed D-hydantoinase and N-carbamoylase. *Biotechnol Prog.* July-August; 16(4):564-70, 2000).

In an exemplary insect system, *Autographa californica* nuclear polyhedrosis virus (AcNPV) is used as a vector to express a desired peptide encoding sequence. The virus grows in *Spodoptera frugiperda* cells. A desired peptide encoding sequence may be cloned individually into a non-essential region (for example the polyhedrin gene) of the virus and placed under control of an AcNPV promoter (for example the polyhedrin promoter). Successful insertion of a desired peptide encoding sequence will result in inactivation of the polyhedrin gene and production of non-occluded recombinant virus (i.e., virus lacking the proteinaceous coat coded for by the polyhedrin gene). The recombinant viruses are then used to infect *Spodoptera frugiperda* cells in which the inserted polynucleotide is expressed (see, e.g., Smith et al., J. Virol. 46:584-593, 1983, and U.S. Pat. No. 4,215,051).

In mammalian host cells, a number of viral-based expression systems may be utilized. In cases where an adenovirus is used as an expression vector, a desired peptide encoding nucleotide sequence may be ligated to an adenovirus transcription/translation control complex, e.g., the late promoter and tripartite leader sequence. This chimeric sequence may then be inserted in the adenovirus genome by in vitro or in vivo recombination. Insertion in a non-essential region of the viral genome (e.g., region E1 or E3) will result in a recombinant virus that is viable and capable of expressing desired peptide products in infected hosts (see, e.g., Logan and Shenk, *Proc. Natl. Acad. Sci. USA* 81:3655-3659, 1984). Specific initiation signals may also be required for efficient translation of inserted desired peptide encoding nucleotide sequences. These signals include the ATG initiation codon and adjacent sequences. In some cases, exogenous translational control signals, including, perhaps, the ATG initiation codon, may be provided. Furthermore, the initiation codon should be in phase with the reading frame of the desired peptide encoding coding sequence to ensure translation of the entire insert. These exogenous translational control signals and initiation codons can be of a variety of origins, both natural and synthetic. The efficiency of expression may be enhanced by the inclusion of appropriate transcription enhancer elements, transcription terminators, etc. (see, e.g., Nevins, *CRC Crit. Rev. Biochem.* 19:307-322, 1986).

In yeast, a number of vectors containing constitutive or inducible promoters may be used. For a review, see, e.g., "Current Protocols in Molecular Biology", supra, Ch. 13, Bitter et al., Meth. Enzymol. 153:516-544, 1987, "DNA Cloning", Vol. II, Ch. 3 (Glover, ed., IRL Press, Washington, D.C., 1986); Bitter, Meth. Enzymol. 152:673-684, 1987, "The Molecular Biology of the Yeast *Saccharomyces*: Life Cycle and Inheritance" (Strathern et al., eds., Cold Spring Harbor Press, Cold Spring Harbor, N.Y., 1981), and "The Molecular Biology of the Yeast *Saccharomyces*: Metabolism and Gene Expression" (Strathern et al., eds., Cold Spring Harbor Press, Cold Spring Harbor, N.Y., 1982).

In plants, a variety of different plant expression vectors can be used, and expression of a desired peptide encoding sequence may be driven by any of a number of promoters. For example, viral promoters such as the 35S RNA or 19S RNA promoters of CaMV (Brisson et al., *Nature* 310:511-514, 1984), or the coat protein promoter of TMV (Takamatsu et al., *EMBO J.* 6:307-311, 1987) may be used. Alternatively, plant promoters such as the promoter of the small subunit of RUBISCO (Coruzzi et al., *EMBO J.* 3:1671-1679, 1984, and Broglie et al., *Science* 224:838-843, 1984), or heat shock promoters, e.g., soybean hsp17.5-E or hsp17.3-B (Gurley et al., *Mol. Cell. Biol.* 6:559-565, 1986) may be used. These constructs can be introduced into plant cells using, for example, Ti plasmids, Ri plasmids, plant virus vectors, direct DNA transformation, microinjection, or electroporation. For reviews of such techniques, see, e.g., Weissbach and Weissbach, in "Methods in Plant Molecular Biology", Section VIII (Schuler and Zielinski, eds., Academic Press, Inc., New York, N.Y., 1988), and "Plant Molecular Biology", 2nd Ed., Ch. 7-9 (Grierson and Covey, eds., Blackie & Son, Ltd., Glasgow, Scotland, United Kingdom, 1988).

In addition, a host cell strain may be chosen that modulates the expression of the inserted desired peptide encoding sequence or modifies and processes the desired peptide encoding nucleic acid sequence in a desired fashion. Such modifications (e.g., glycosylation) and processing (e.g., cleavage) of protein products may affect certain functions of the protein. Different host cells have characteristic and specific mechanisms for post-translational processing and modification of proteins and peptides. Appropriate cell lines or host systems can be chosen to ensure the correct or desired modification and processing of the desired protein, polypeptide, or peptide expressed. To this end, eukaryotic host cells that possess the cellular machinery for desired processing of the primary transcript, and glycosylation and/or phosphorylation of desired peptide encoding nucleic acid sequence be used. Such mammalian host cells include, but are not limited to, Chinese hamster ovary (CHO), VERO, baby hamster kidney (BHK), HeLa, monkey kidney (COS), MDCK, 293, 3T3, WI38, human hepatocellular carcinoma (e.g., Hep G2), and U937 cells.

In certain embodiments the presently disclosed compositions and are used in the treatment of metastatic tumor cell tissue. In certain embodiments the presently disclosed compositions can be administered in combination with one or more additional compounds or agents ("additional active agents") for the treatment, management, and/or prevention of metastatic tumor cell expansion. Such therapies can be administered to a patient at therapeutically effective doses to treat or ameliorate metastatic tumor cell associated disorders and cancers. A therapeutically effective dose refers to that amount of the compound sufficient to result in any delay in onset, amelioration, or retardation of disease symptoms.

In some embodiments, are isolated peptides comprising an amino acid sequence of BLMP1-6: SEQ ID NO: 1, SEQ ID NO: 2, SEQ ID NO: 3, SEQ ID NO: 4, SEQ ID NO: 5, or SEQ ID NO: 6 and wherein said peptide binds to stromal cells in vivo. In some embodiments, the metastatic tumor cell tissue is located in the primary tumors.

In some embodiments are protein compositions comprising a peptide having the amino acid sequence of BLMP1-6: SEQ ID NO: 1, SEQ ID NO: 2, SEQ ID NO: 3, SEQ ID NO: 4, SEQ ID NO: 5, SEQ ID NO: 6, some embodiments the peptides or protein compositions are composed entirely of D-amino acids. In some embodiments the peptides or protein compositions are coupled to an imaging agent. In some embodiments the peptides or protein compositions are coupled to cytotoxic or pro-apoptotic agent. In some embodiments the peptides or protein compositions are coupled to an agent that induces a white metastatic tumor cell tissue to convert to a brown metastatic tumor cell tissue. In some embodiments the peptides or protein compositions are coupled to an agent that activates b3-adrenergic receptors in white metastatic tumor cell tissue. In some embodiments the agents are peptides composed of D-amino acids. In some embodiments the peptides are coupled through a linker and in some embodiments the linker comprises aminohexanoic acid.

In some embodiments the protein compositions are composed entirely of D-amino acids and comprise a peptide having the amino acid sequence of SEQ ID NO: 1, SEQ ID NO: 2, SEQ ID NO: 3, SEQ ID NO: 4, SEQ ID NO: 5, SEQ ID NO: 6, and wherein the composition binds to stromal cells located in for example metastatic tumor cell tissue, fibrotic tissue or tumor tissue in vivo. In some embodiments, the peptide is coupled to an imaging agent, a cytotoxic, a pro-apoptotic agent.

In some embodiments are isolated nucleic acid molecules comprising a nucleotide sequence that encodes an amino acid sequence of SEQ ID NO: 1, SEQ ID NO: 2, SEQ ID NO: 3, SEQ ID NO: 4, SEQ ID NO: 5 or SEQ ID NO: 6. In some embodiments, are expression vectors comprising these nucleic acid molecules and host cells comprising the expression vectors.

In some embodiments are methods of delivering a cytotoxic, pro-apoptosis, transdevelopmental or imaging peptide to metastatic tumor cell tissue, said methods comprising: (a) coupling a cytotoxic, pro-apoptosis, transdevelopmental or imaging peptide to a targeting peptide having an amino acid sequence selected from the group consisting of SEQ ID NO: 1, SEQ ID NO: 2, SEQ ID NO: 3, SEQ ID NO: 4, SEQ ID NO: 5 or SEQ ID NO: 6, and (b) selectively binding the coupled targeting peptide to an metastatic tumor cell tissue. In some embodiments the peptides are composed of D-amino acids. In some embodiments the peptides are coupled through a linker and in some embodiments the linker comprises aminohexanoic acid.

In other embodiments, are methods of delivering a compound or agent to an metastatic tumor cell tissue comprising: exposing a compound or agent-coupled peptide to a population of cells suspected of containing metastatic tumor cell tissue, wherein said compound- or agent-coupled peptide comprises the compound or agent coupled to a peptide that selectively binds to metastatic tumor cell tissue, wherein the peptide is less than 100 amino acids in length and includes an metastatic tumor cell tissue targeting motif having an amino acid sequence selected from the group consisting of SEQ ID NO: 1, SEQ ID NO: 2, SEQ ID NO: 3, SEQ ID NO: 4, SEQ ID NO: 5 or SEQ ID NO: 6. In some embodiments the peptides are composed of D-amino acids. In some embodiments the peptides are coupled through a linker and in some embodiments the linker comprises aminohexanoic acid. In some embodiments, both the peptide and the agent are composed of D-amino acids. In some embodiments, the agent comprises a cytotoxic or pro-apoptotic peptide. In some embodiments, the peptide is composed of D-amino acids. In some embodiments, the agent comprises a imaging agent. In some embodiments exposing comprises, exposing a subject to the peptide that may be coupled to an agent, to treat an adiposity-associated disorder such as, but not limited to, obesity, fibrosis or cancer. In some embodiments the population of cells are from or in a human subject. In some embodiments the population of cells are from or in a veterinary subject.

In some embodiments the cells are in a population of cells ex vivo as is a thin section of a tissue. In some embodiments are methods of detecting metastatic tumor cell stromal cells in a heterogeneous cell population based on said selective binding of the compound- or agent-coupled peptide to said metastatic tumor cell tissue. In some embodiments are methods of detecting metastatic tumor cell tissue as identifying a patient who would benefit from treatment with a peptide targeted peptide is coupled to a compound- or agent such as, but not limited to a cytotoxic or pro-apoptotic agent. Examples of patients include human or veterinary patients suffering from a metastatic tumor cell associated disorder and cancer.

Toxicity and therapeutic efficacy of such compositions can be determined by standard pharmaceutical procedures in cell cultures or experimental animals, e.g., for determining the $LD_{50}$ (the dose lethal to 50% of the population) and the $ED_{50}$ (the dose therapeutically effective in 50% of the population). The dose ratio between toxic and therapeutic effects is the therapeutic index, expressed as the ratio $LD_{50}/ED_{50}$. Compositions that exhibit large therapeutic indices are preferred. Compounds that exhibit toxic side effects may be used in certain embodiments, however, care should usually be taken to design delivery systems that target such compositions preferentially to the site of affected tissue, in order to minimize potential damage to uninfected cells and, thereby, reduce side effects.

Data obtained from cell culture assays and animal studies can be used in formulating a range of dosages for use in humans. The dosages of such compositions lie preferably within a range of circulating concentrations that include the $ED_{50}$ with little or no toxicity. The dosage may vary within this range depending on the dosage form employed and the route of administration utilized. For any composition, the therapeutically effective dose can be estimated initially from cell culture assays. A dose may be formulated in animal models to achieve a circulating plasma concentration range that includes the $IC_{50}$ (i.e., the concentration of the test composition that achieves a half-maximal inhibition of symptoms) as determined in cell culture. Such information can be used to more accurately determine useful doses in humans. Plasma levels may be measured, for example, by high performance liquid chromatography.

When the therapeutic treatment of metastatic tumor cell and associated symptoms. The appropriate dosage may also be determined using animal studies to determine the maximal tolerable dose, or MTD, of a bioactive agent per kilogram weight of the test subject. In general, at least one animal species tested is mammalian. Those skilled in the art regularly extrapolate doses for efficacy and avoiding toxicity to other species, including human. Before human studies of efficacy are undertaken, Phase I clinical studies help establish safe doses.

Additionally, the bioactive agent may be coupled or complexed with a variety of well-established compositions or structures that, for instance, enhance the stability of the bioactive agent, or otherwise enhance its pharmacological properties (e.g., increase in vivo half-life, reduce toxicity, etc.).

Such therapeutic agents can be administered by any number of methods known to those of ordinary skill in the art including, but not limited to, inhalation, subcutaneous (sub-q), intravenous (I.V.), intraperitoneal (I.P.), intramuscular (I.M.), or intrathecal injection, or topically applied (transderm, ointments, creams, salves, eye drops, and the like), as described in greater detail below.

Pharmaceutical compositions for use in accordance with the presently described compositions may be formulated in conventional manners using one or more physiologically acceptable carriers or excipients. The pharmaceutical compositions can comprise formulation materials for modifying, maintaining, or preserving, for example, the pH, osmolarity, viscosity, clarity, color, isotonicity, odor, sterility, stability, rate of dissolution or release, adsorption or penetration of the composition. Suitable formulation materials include, but are not limited to amino acids (for example, glycine, glutamine, asparagine, arginine and lysine); antimicrobials; antioxidants (for example, ascorbic acid, sodium sulfite and sodium hydrogen-sulfite); buffers (for example, borate, bicarbonate, Tris-HCl, citrates, phosphates and other organic acids); bulking agents (for example, mannitol and glycine); chelating agents (for example, ethylenediamine tetraacetic acid (EDTA)); complexing agents (for example, caffeine, polyvinylpyrrolidone, beta-cyclodextrin, and hydroxypropyl-beta-cyclodextrin); fillers; monosaccharides, disaccharides, and other carbohydrates (for example, glucose, mannose and dextrins); proteins (for example, serum albumin, gelatin and immunoglobulins); coloring, flavoring, and diluting agents; emulsifying agents; hydrophilic polymers (for example, polyvinylpyrrolidone); low molecular weight peptides; salt-forming counterions (for example, sodium); preservatives (for example, benzalkonium chloride, benzoic acid, salicylic acid, thimerosal, phenethyl alcohol, methylparaben, propylparaben, chlorhexidine, sorbic acid and hydrogen peroxide); solvents (for example, glycerin, propylene glycol and polyethylene glycol); sugar alcohols (for example, mannitol and sorbitol); suspending agents; surfactants or wetting agents (for example, pluronics, PEG, sorbitan esters, polysorbates (for example, polysorbate 20 and polysorbate 80), triton, tromethamine, lecithin, cholesterol, and tyloxapal); stability enhancing agents (for example, sucrose and sorbitol); tonicity enhancing agents (for example, alkali metal halides (for example, sodium or potassium chloride), mannitol, and sorbitol); delivery vehicles; diluents; excipients; and pharmaceutical adjuvants ("Remington's Pharmaceutical Sciences", 18th Ed. (Gennaro, ed., Mack Publishing Company, Easton, Pa., 1990)).

Additionally, the described therapeutic peptides can be linked to a half-life extending vehicle. Certain exemplary half-life extending vehicles are known in the art, and include, but are not limited to, the Fc domain, polyethylene glycol, and dextran (see, e.g., PCT Patent Application Publication No. WO 99/25044).

These agents may be formulated for parenteral administration by injection, e.g., by bolus injection or continuous infusion. Formulations for injection may be presented in unit dosage form, e.g., in ampules or in multi-dose containers, with an added preservative. The compositions may take such forms as suspensions, solutions or emulsions in oily or aqueous vehicles, and may contain formulatory agents such as suspending, stabilizing and/or dispersing agents. Alternatively, the active ingredient may be in powder form for constitution with a suitable vehicle, e.g., sterile pyrogen-free water, before use.

The agents may also be formulated as compositions for rectal administration such as suppositories or retention enemas, e.g., containing conventional suppository bases such as cocoa butter or other glycerides.

In addition to the formulations described previously, the agents may also be formulated as a depot preparation. Such long acting formulations may be administered by implantation (for example subcutaneously or intramuscularly) or by intramuscular injection. For example, agents may be formulated with suitable polymeric or hydrophobic materials (for example as an emulsion in an acceptable oil), ion exchange resins, or as sparingly soluble derivatives, for example, as a sparingly soluble salt. The compositions may, if desired, be presented in a pack or dispenser device, which may contain one or more unit dosage forms containing the active ingredient. The pack may for example comprise metal or plastic foil, such as a blister pack. The pack or dispenser device may be accompanied by instructions for administration.

Active compositions can be administered by controlled release means or by delivery devices that are well-known to those of ordinary skill in the art. Examples include, but are not limited to, those described in U.S. Pat. Nos. 3,845,770, 3,916,899, 3,536,809, 3,598,123, 4,008,719, 5,674,533, 5,059,595, 5,591,767, 5,120,548, 5,073,543, 5,639,476, 5,354,556, and 5,733,566. Such dosage forms can be used to provide slow or controlled-release of one or more active ingredients using, for example, hydropropylmethyl cellulose, other polymer matrices, gels, permeable membranes, osmotic systems, multilayer coatings, microparticles, liposomes, microspheres, or a combination thereof, to provide the desired release profile in varying proportions. Exemplary sustained release matrices include, but are not limited to, polyesters, hydrogels, polylactides (see, e.g., U.S. Pat. No. 3,773,919 and European Patent Application Publication No. EP 058,481), copolymers of L-glutamic acid and gamma ethyl-L-glutamate (see, e.g., Sidman et al., *Biopolymers* 22:547-556, 1983), poly (2-hydroxyethyl-methacrylate) (see, e.g., Langer et al., *J. Biomed. Mater. Res.* 15:167-277, 1981, and Langer, *Chemtech* 12:98-105, 1982), ethylene vinyl acetate (Langer et al., supra), and poly-D(–)-3-hydroxybutyric acid (European Patent Application Publication No. EP 133,988). Sustained release compositions may include liposomes, which can be prepared by any of several methods known in the art (see, e.g., Eppstein et al., *Proc. Natl. Acad. Sci. USA* 82:3688-3692, 1985, and European Patent Application Publication Nos. EP 036,676, EP 088, 046, and EP 143,949). Suitable controlled-release formulations known to those of ordinary skill in the art, including those described herein, can be readily selected for use with the presently disclosed compositions. Certain embodiments encompass single unit dosage forms suitable for oral administration such as, but not limited to, tablets, capsules, gel caps, and caplets that are adapted for controlled-release.

All controlled-release pharmaceutical products have a common goal of improving therapy over that achieved by their non-controlled counterparts. Ideally, use of an optimally designed controlled-release preparation in medical treatment is characterized by a minimum of drug substance being employed to cure or control the condition in a minimum amount of time. Advantages of controlled-release formulations include extended activity of the drug, reduced dosage frequency, and increased patient compliance. In addition, controlled-release formulations can be used to affect the time of onset of action or other characteristics, such as blood levels of the drug, and can thus affect the occurrence of side (e.g., adverse) effects.

Most controlled-release formulations are designed to initially release an amount of active ingredient that promptly produces the desired therapeutic effect, and gradually and continually release other amounts of active ingredient to maintain this level of therapeutic or prophylactic effect over an extended period of time. In order to maintain this relatively constant level of active ingredient in the body, the drug must be released from the dosage form at a rate that will replace the amount of active ingredient being metabolized and excreted from the body. Controlled-release of an active ingredient can be stimulated by various conditions including, but not limited to, pH, temperature, enzymes, water, or other physiological conditions or compositions.

In some cases, active ingredients of the disclosed methods and compositions are preferably not administered to a patient at the same time or by the same route of administration. Therefore, in some embodiments are kits that, when used by the medical practitioner, can simplify the administration of appropriate amounts of active ingredients to a patient.

A typical kit comprises a single unit dosage form of one or more of the therapeutic agents disclosed, alone or in combination with a single unit dosage form of another agent that may be used in combination with the disclosed compositions. Disclosed kits can further comprise devices that are used to administer the active ingredients. Examples of such devices include, but are not limited to, syringes, drip bags, patches, and inhalers.

Disclosed kits can further comprise pharmaceutically acceptable vehicles that can be used to administer one or more active ingredients. For example, if an active ingredient is provided in a solid form that must be reconstituted for parenteral administration, the kit can comprise a sealed container of a suitable vehicle in which the active ingredient can be dissolved to form a particulate-free sterile solution that is suitable for parenteral administration. Examples of pharmaceutically acceptable vehicles include, but are not limited to: Water for Injection USP; aqueous vehicles such as, but not limited to, Sodium Chloride Injection, Ringer's Injection, Dextrose Injection, Dextrose and Sodium Chloride Injection, and Lactated Ringer's Injection; water-miscible vehicles such as, but not limited to, ethyl alcohol, polyethylene glycol, and polypropylene glycol; and non-aqueous vehicles such as, but not limited to, corn oil, cottonseed oil, peanut oil, sesame oil, ethyl oleate, isopropyl myristate, and benzyl benzoate. However, in specific embodiments, the disclosed formulations do not contain any alcohols or other co-solvents, oils or proteins.

The following section provides further details regarding examples of various embodiments. It should be appreciated by those of skill in the art that the techniques disclosed in the examples that follow represent techniques and/or compositions discovered by the inventor to function well. However, those of skill in the art should, in light of the disclosure, appreciate that many changes can be made in the specific embodiments which are disclosed and still obtain a like or similar result without departing from the spirit and scope of the invention. These examples are illustrations of the methods and systems described herein and are not intended to limit the scope of the invention.

C. Examples

Example 1—Materials & Methods

Cell lines and primary cell culture: All cell lines were cultured in DMEM media (Hyclone) supplemented with penicillin-streptomycin (Gibco) and 10% fetal bovine serum (Atlas Biologicals). B16F10, MDA-MB-231, and 3T3L1 cell lines were from ATCC. 4T1.2 (4T1) cells expressing mCherry and Luciferase were a gift from S. Mani. Cisplatin-resistant 4T1.2 (4T1.2-CTX) cells were generated after treatment with cisplatin (Tocris Biosciences, 180 ng/mL).

Peptides: The exemplary Hunter-killer (HK) peptides HK-BLMP5 and HK-BLMP6 were generated as "all-D-amino acid" cysteine-cyclized peptides (Celtek Bioscience). The proteolysis-resistant peptides were synthesized as acetate salts with an amino-hexanoic acid linker (NH—$(CH_2)_5$—CO) conjugating the BLMP and the apoptotic moiety KLAKLAKKLAKLAK (KLAKLAK$_2$): SEQ ID NO:13. Following chromatographic purification, peptides were dissolved in PBS into 10 mM aliquots and stored frozen until further use. For the homing/internalization assay, peptides were biotin-labelled using the Sulfo-NHS-LC-Biotin Kit (APExBIO). Cells were plated in 24 well plates ($1\times10^5$ cells/well), treated. Following treatment with either HK-BLMP6 (0.1 mM) or HK-BLMP5 (0.3 mM) in 0.5 ml serum free culture media for 8 hours, cells were stained with 0.4% Trypan Blue solution (MP Biomedicals) (Daquinag et al., 2016). For radioactive studies, 1,4,7,10-tetraazacyclotetradecane-N',N'',N''',N''''-tetra-acetic acid (DOTA) t-Bu ester was purchased from Macrocyclics (Dallas, TX) and peptides were synthesized by Bachem Americas (Torrance, CA). DOTA-peptide conjugation was performed on solid-phase using previously described protocols (Azhdarinia et al., 2011). Radiolabeling with $^{67}$GaCl$_3$ and HPLC determination of purity were performed according to published procedures (Hernandez Vargas et al., 2019). The purified radiotracers were diluted with PBS to a concentration 100 µCi/mL for animal studies.

Animal experiments: Rodent studies were authorized by the Institutional Animal Care and Use Committees of UTHealth. Spontaneous cancer progression was modelled by injecting $2\times10^4$ 4 T1.2 (mCherry+ Luciferase+) cells into the mammary fat pad of 10-week-old female Balb/c mice (Jackson Laboratory) with a 31-gauge needle. Primary tumor volume was measured weekly with calipers and calculated using the (length×width$^2$)/2 formula. At a tumor volume of ~200 mm$^3$, mice were randomized into two cohorts and administered either vehicle (1×PBS) or cisplatin (Tocris Biosciences; 2.5 mg/kg) retro-orbitally once a week for three weeks. Metastatic progression was monitored with bioluminescence imaging. For experimental metastasis modeling in C57BL/6 mice (Jackson Laboratory), $1\times10^5$ B16F10 cells were intravenously injected into the tail vein and mice were used after 2 weeks. In both mice models, pulmonary metastases were observed 3 weeks post implantation. The screen for metastasis-homing peptides was performed using a 50:50 mixture of phage cyclic peptide libraries CX$_7$C and CX$_8$C (C: cysteine; X: any amino acid residue) provided by Erkki Koivunen (Arap et al., 2002). For every bio-panning round, a mouse with metastases (between weeks 3 and 4) was intravenously injected with $10^{10}$ transducing units (TU) of the library. After 3 hours of circulation, the heart was perfused with 10 ml phosphate buffered saline (PBS). Flow cytometry was performed on the cell suspension from collagenase/dispase-digested lungs to isolate mCherry-positive metastatic tumor cells by using FACSAria/FacsDiva software (BD Biosciences). Selected phage were amplified through K91 E. coli infection and quantified via TU counting. For each round, clone enrichment was quantified based on recovery frequency among 96 phage peptide-coding inserts sequenced from PCR-amplified phage DNA (Kolonin et al., 2004). Homing was validated by injection of $10^{10}$ TU of individual phage-peptide clones (week 3 after tumor cell injection). For the radioactive biodistribution analysis, B16F10 tumor-grafted female C57BL/6 mice (n=4 per cohort) were intravenously injected with 5 nM $^{67}$Ga-DOTA (non-targeted control), $^{67}$Ga-DOTA-BLMP5 or $^{67}$Ga-DOTA-BLMP6 individually. Mice were euthanized 1 hour after tracer injection. Selected tissues and blood were collected. Tissues were washed with PBS. Radioactive uptake was measured using a Cobra II automated gamma counter (Packard) and expressed as percentage of the injected dose per gram tissue (% ID/g tissue).

Immunofluorescence for tissue and cell analysis: Immunofluorescence on cells and formalin-fixed paraffin-embedded tissue sections was performed as described Zhang et al., 2012). Primary antibodies used: rabbit anti-Fd bacteriophage (Sigma Aldrich, 1:500), rabbit anti-Asp175-cleaved Caspase3 (Cell Signaling Technology, 1:100), mouse anti-E Cadherin and mouse anti-N Cadherin (BD Biosciences, 1:100). Secondary antibodies used: donkey Alexa 488-conjugated IgG (Invitrogen, 1:300) and Cy3-conjugated IgG (Jackson ImmunoResearch, 1:300). Biotinylated peptide internalization was visualized with Cy3-conjugated streptavidin IgG (Thermo Fischer Scientific, 1:50). Nuclei were stained with Hoechst 33258 (Invitrogen, 1:2000). Tissue and cell images were acquired with a Nikon Eclipse TE2000E Widefield Fluorescence Microscope (Nikon Instruments Inc.). Image quantification included 5 random microscopic fields of view at 20× magnification. Images were processed and analyzed with ImageJ software (NIH and University of Wisconsin). Cadherin co-localization was quantified based on the previously described ImageJ software object based-approach (JACoP) methodology based on the Mander's coefficient (Bolte and Cordelieres, 2006).

Statistical Analysis: GraphPad Prism v.9.0.2 was used to graph data as mean±S.E.M. Statistical significance was determined with unpaired t-test or two-way ANOVA built-in analysis tools. P-values (p)<0.05 were considered significant.

Example 2: Screen for Peptides Homing to Lung Metastases

An adaptation of the previously described in vivo biopanning methodology (Kolonin et al., 2006), was implemented in an orthotopic mouse model of triple negative breast cancer (TNBC) to isolate pulmonary metastatic tumor cell specific probes (FIG. 1A). To simulate the clinical setting in which patients are treated with chemotherapy, the inventors used cisplatin, a drug that has shown a comparatively high efficacy in patients with TNBC. They screened a pool of over $10^{10}$ combinatorial peptides displayed as fusions on the pIII protein of filamentous M13 bacteriophages. Mice were grafted with 4T1.2 tumor cells expressing red fluorescent protein (mCherry) and luciferase (Luc) and, once primary tumors became detectable, were treated with cisplatin as described (Su et al., 2021). Following intravenous injection of the $CX_7C/CX_8C$ phage-peptide library into mice, phage bound to metastatic cells was recovered from mCherry+ cells isolated from lung suspension by fluorescence activated cell sorting (FACS) (FIG. 1A). After three enrichment/selection rounds, six phage-displayed peptides were repeatedly recovered with a frequency above 1%. These peptides were named breast-lung metastasis peptides (BLMP), BLMP1 through BLMP6 (FIG. 1B). Sequencing of phage DNA revealed the following amino acid sequences of the peptide inserts: CGVLPYSLC (BLMP1; SEQ ID NO: 6); CSGVGIASC (BLMP2; SEQ ID NO: 5); CEGPMYAKC (BLMP3; SEQ ID NO:4); CHLSFSTAC (BLMP4; SEQ ID NO: 3); CLRHSSKIC (BLMP5; SEQ ID NO: 2) and CRAGVGRGC (BLMP6; SEQ ID NO: 1). BLMP5 and BLMP6 were selected as candidates for future studies owing to their most significant enrichment (p≤0.0001) in the last round of biopanning (FIG. 1B). Radio-HPLC analysis of the $^{67}$Ga-labeled peptides showed >95% radiochemical purity following C-18 Sep-Pak purification.

To confirm cancer cells as the target of peptides, cell culture was used to analyze individual phage-displayed BLMPs. Immunofluorescence analysis of cultured 4T1.2 and B16F10 murine melanoma cells incubated with individual phage-displayed peptides revealed that both BLMP5-phage and BLMP6-phage were internalized by over 50% of cancer cells (FIG. 1C). No internalization was seen upon incubation with control insert-less phage that lacks a peptide insert (FIG. 5A). Murine 3T3L1 preadipocytes were used as a negative control and uptake was not observed for BLMP6-phage (FIG. 1C). Compared to phage-displayed BLMP6, BLMP1, BLMP2, BLMP3, BLMP4 and BLMP5 exhibited higher non-specific uptake by 3T3L1 cells (FIG. 1C; FIGS. 5B-C). Quantification of phage-displayed peptide binding based on phage TU recovery demonstrated either a lack of binding to B16F10 cells or nonspecific binding to 3T3L1 cells for BLMP1 through BLMP5 (FIG. 1D). This experiment confirmed selective BLMP6-phage affinity for both B16F10 and 4T1.2 cells (FIG. 1D). Phage-displayed BLMP5 and BLMP6 exhibited binding to MDA-MB-231 human TNBC cells suggesting that their peptide receptors are conserved (FIG. 5D).

Example 3: Validation of Peptide Metastasis Homing

Homing of individual BLMPs to lung metastases was examined through intravenous administration of $10^{10}$ TU individual phage-displayed peptide clones into mice. Tissue biodistribution was analyzed by immunofluorescence using phage-specific antibodies. Both BLMP5-phage and BLMP6-phage were found localized to lung metastases, identified by histophatology, but not to normal lung tissue (FIG. 2A-B). A negative control phage lacking a peptide insert did not localize to metastases upon injection (FIG. 6A). BLMP5-phage exhibited homing to lungs in 4T1.2 spontaneous metastases (FIG. 2A) but not in melanoma B16F10 experimental metastases (FIG. 2A) mouse model. BLMP6-phage exhibited homing to lungs in both 4T1.2 spontaneous metastases and melanoma B16F10 experimental metastases mouse models (FIG. 2B). In macro-metastases, BLMP5 localized predominantly along the invasive edges (FIG. 2A), whereas BLMP6 was abundant throughout (FIG. 2B). The lack of BLMP-phage localization to lungs in cancer-free mice further confirmed the metastasis tropism for both BLMP5 and BLMP6 (FIG. 6B). Non-specific accumulation of phage in the liver reticulo-endothelial system was, as expected, observed for phage irrespective of the peptide insert (FIG. 2A), including insert-less control phage (FIG. 6A). Besides the expected liver uptake, trace amounts of BLMP6-phage were observed in the kidney for the B16F10 model (FIG. 2B) indicating renal dissemination of cancer cells. BLMP5-phage and BLMP6-phage was also observed in primary 4T1.2 tumors. While BLMP5 was dispersed throughout the tumor (FIG. 2A), BLMP6 was observed selectively in a sub-population of cells associated with the vasculature (FIG. 2B). These results indicate that BLMP5 and BLMP6 bind to distinct receptors expressed in a fraction of tumor cells and in metastases.

Example 4: Non-Invasive Detection of Metastases with Peptide Probes

Next, the inventors confirmed tumor cell tropism of BLMP peptides outside the phage context. They used the B16F10 experimental metastasis model to test if cancer cells can be detected by tissue distribution studies with radiolabeled peptide probes. BLMP5 and BLMP6 were conjugated with the radiometal chelator DOTA, which was then used for labeling with $^{67}$Ga. Uptake in most normal organs was <0.5% for both $^{67}$Ga-labeled BLMP5 and BLMP6 peptides (FIG. 2C), indicating low non-specific uptake that was similar for the non-targeted control agent ($^{67}$Ga-DOTA) (FIG. 6C). As expected, the major site of uptake was the kidneys due to high renal excretion of the radiolabeled peptides (FIG. 2C). Analysis of organs for melanin-positive B16F10 cells revealed the presence of metastases in the kidneys of some B16F10 cell-injected mice (FIG. 2D). This accounts for the kidney uptake of the radiopeptides being higher than for non-targeted $^{67}$Ga-DOTA (FIG. 6C) and confirms peptide homing to cancer cells. Importantly, the lung signal for $^{67}$Ga-BLMP6-injected mice containing lung metastasis was >4 times higher than in the lungs of cancer-free mice (FIG. 2C; FIG. 6D). No significant lung uptake was observed for $^{67}$Ga-BLMP5-injected mice containing lung metastasis (FIG. 2C). In a separate experiment, the inventors injected $^{67}$Ga-BLMP5 and $^{67}$Ga-BLMP6 peptide into mice grafted with B16F10 tumors. While there was a detectable uptake of $^{67}$Ga-BLMP5, no uptake of $^{67}$Ga-BLMP6 by primary tumors above the $^{67}$Ga-DOTA background was detected (FIG. 6E). These data demonstrate BLMP6 homing to metastases in and out of phage context and identify this peptide as the preferred lead for further investigation.

Example 5: Cancer Cell Ablation with Hunter-Killer Peptides

To test if BLMPs can be used for targeted therapy delivery, the inventors converted them into hunter-killer peptides based on the previously published strategy (Ellerby et al., 2008). The lead pro-apoptotic peptide termed HK-BLMP6 was synthesized as a fusion with the KLAKLAK$_2$ (SEQ ID NO:14) apoptosis-inducing moiety via an aminohexanoic acid linker (FIG. 3A). HK-BLMP5 of the same design was synthesized to be tested in parallel (FIG. 7A). First, the inventors labelled HK-BLMPs with biotin to generate Bio-HK-BLMP6 and Bio-HK-BLMP5, in which KLAKLAK$_2$ domain activity was neutralized. These biotinylated peptides were used to confirm that cancer cell uptake, essential for pro-apoptotic activity of HK peptides was retained. Fluorescence analysis with Cy3-straptavidin probe revealed comparable uptake of Bio-HK-BLMP6 by murine 4T1.2 and B16F10 tumor cells, as well as by human MDA-MB-231 adenocarcinoma cells (FIG. 3B-C). Confirming specificity for cancer cells, uptake of Bio-HK-BLMP6 by control 3T3L1 murine fibroblasts was marginal (FIG. 3B-C). In contrast, Bio-HK-BLMP5 displayed non-specific internalization by both cancer and control 3T3L1 cells (FIG. 7A). This observation, consistent with the lack of $^{67}$Ga-BLMP5 homing to lung metastasis indicates that modification of BLMP5 affects its receptor binding.

The inventors then tested the activity of biotin-free hunter-killer peptides. Following treatment with 0.1 mM HK-BLMP6 in vitro, the trypan blue exclusion assay revealed significant cell death induction in the three tumor cell lines (FIG. 3C). Immunofluorescence analysis corroborated HK-BLMP6-induced apoptosis mediated by caspase-3 cleavage (FIG. 7B). Importantly, HK-BLMP6 did not induce cell death in control 3T3L1 cells (FIG. 3C; FIG. 7B). No cancer cell death was observed upon treatment with 0.1 mM untargeted KLAKLAK$_2$ (SEQ ID NO: 14: FIGS. 7C-D). In contrast to HK-BLMP6, HK-BLMP5 did not induce cell death at 0.1 mM, as measured by trypan blue staining. While 0.3 mM HK-BLMP5 concentration did kill a fraction of cancer cells, elevated trypan blue staining was also observed in 3T3L1 preadipocytes, (FIG. 7D), again pointing to diminished selectivity of modified BLMP5. These findings demonstrate the potential utility of BLMP6 as a vehicle for selective agent delivery into cancer cells.

Example 6: Peptide Selectivity for Cancer Cells Undergoing EMT

Localization of BLMP peptides at the periphery of pulmonary metastases (FIG. 2A-B) prompted an investigation into the potential characteristics of cancer cells favoring such a distinctive localization pattern. Because EMT is a feature of cells at invasive tumor front (Kalluri and Weinberg, 2009), the inventors tested if peptides home to cancer cells that lose their epithelial phenotype. For this, the inventors used antibodies against N-Cadherin, marking mesenchymal cells, and E-Cadherin, marking epithelial cells (Dongre et al., 2017) for immunofluorescence analysis on lung tissue sections derived from murine TNBC and melanoma models. BLMP6-Phage demonstrated a definitive selectivity for metastatic tumor cells that primarily expressed N-Cadherin (FIG. 4A). Concomitantly, no localization to E-cadherin+ epithelial cells was seen, an observation consistent across both cancer models assessed (FIG. 4A). Significance of EMT co-localization for BLMP6-Phage in both metastasis models was quantified by ImageJ (FIG. 4B). Selectivity for N-cadherin+E-cadherin-cells was also observed for BLMP5-Phage (FIG. 8A).

Peptide selectivity for cells undergoing EMT was verified by analysis of cell lines, which display heterogeneity in culture. Both BLMP6-Phage and Bio-HK-BLMP6 preferentially bound to 4T1, B16F10 and MDA-MB-231 cancer cells that expressed N-cadherin but not E-cadherin (FIG. 4C). A similar preference for N-cadherin+E-cadherin– cells was exhibited by BLMP5 in culture (FIG. 8B). Because chemotherapy has been shown to preferentially kill epithelial cancer cells and select for those that undergo EMT (Su et al., 2019), the inventors treated cells with cisplatin. Indeed, cisplatin-resistant 4T1.2 displayed reduced E-Cadherin expression while maintaining BLMP6 binding (FIG. 4C). These results were confirmed by N-cadherin/BLMP6-phage co-staining on cultured 4T1.2 cells treated with cisplatin and B16F10 cells (FIG. 8C). N-cadherin IF on primary 4T1.2 tumors from mice injected with BLMP6-phage indicated its homing to cells undergoing EMT (FIG. 8C). Selectivity for cells with the EMT phenotype was also confirmed for BLMP5 (FIG. 8D-E). Combined, these observations suggest that BLMP5 and BLMP6 bind to cancer cell receptors expressed on metastatic cancer cells that have undergone the EMT.

Example 7: Discussion

Metastatic carcinoma progression despite the initial response of primary tumors to chemotherapy often occurs due to survival of cells with EMT properties. The identification of compounds selective for cancer post-EMT could help target metastases. Herein is the characterization of peptides homing to metastatic cells. The peptides BLMP5 and BLMP6 were validated in vivo and in cell culture models and were shown to be selective for cancer cells undergoing EMT. Selective apoptosis induction with BLMP6-derived HK peptide provides proof-of-principle to be subsequently tested in other cancer models. Non-invasive metastasis detection with a radiolabeled BLMP6 peptide also provides an example of promising imaging applications of these new reagents.

Without further elaboration, it is believed that one skilled in the art can, using the description herein, utilize the present methods to their fullest extent. The embodiments described herein are to be construed as illustrative and not as constraining the remainder of the disclosure in any way whatsoever. While preferred embodiments have been shown and described, many variations and modifications thereof can be made by one skilled in the art without departing from the spirit and teachings of the presently disclosed methods. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

D. References Cited

The following references, to the extent that they provide exemplary procedural or other details supplementary to those set forth herein, are specifically incorporated herein by reference.

Welch, D. R. and D. R. Hurst, *Defining the Hallmarks of Metastasis*. Cancer Res, 2019. 79(12): p. 3011-3027.

Valastyan, S. and R. A. Weinberg, *Tumor metastasis: molecular insights and evolving paradigms*. Cell, 2011. 147(2): p. 275-92.

Ganesh, K. and J. Massague, *Targeting metastatic cancer*. Nat Med, 2021. 27(1): p. 34-44.

Kalluri, R. and R. A. Weinberg, *The basics of epithelial-mesenchymal transition*. J Clin Invest, 2009. 119(6): p. 1420-8.

Yang, J., et al., *Guidelines and definitions for research on epithelial-mesenchymal transition*. Nature Reviews Molecular Cell Biology, 2020. 21(6): p. 341-352.

Aware, V., et al., *Cyclopentyl-pyrimidine based analogues as novel and potent IGF-1R inhibitor*. Eur J Med Chem, 2015. 92: p. 246-56.

Thomas, S. M. and J. R. Grandis, *Targeting mesenchymal exaptation to mitigate tumor growth*. Cell Cycle, 2011. 10(16): p. 2626-7.

Pattabiraman, D. R. and R. A. Weinberg, *Targeting the Epithelial-to-Mesenchymal Transition: The Case for Differentiation-Based Therapy*. Cold Spring Harb Symp Quant Biol, 2016. 81: p. 11-19.

Arap, W., et al., *Steps toward mapping the human vasculature by phage display*. Nat Med, 2002. 8(2): p. 121-7.

Daquinag, A. C., et al., *Targeted Proapoptotic Peptides Depleting Metastatic tumor cell Stromal Cells Inhibit Tumor Growth*. Mol Ther, 2016. 24(1): p. 34-40.

Daquinag, A. C., et al., *Depletion of white adipocyte progenitors induces beige adipocyte differentiation and suppresses obesity development*. Cell Death Differ, 2015. 22(2): p. 351-63.

Azhdarinia, A., et al., *Characterization of chemical, radiochemical and optical properties of a dual-labeled MMP-9 targeting peptide*. Bioorg Med Chem, 2011. 19(12): p. 3769-76.

Hernandez Vargas, S., et al., *Specific Targeting of Somatostatin Receptor Subtype-2 for Fluorescence-Guided Surgery*. Clin Cancer Res, 2019. 25(14): p. 4332-4342.

Kolonin, M. G., et al., *Reversal of obesity by targeted ablation of metastatic tumor cell tissue*. Nat Med, 2004. 10(6): p. 625-32.

Zhang, Y., et al., *Stromal progenitor cells from endogenous metastatic tumor cell tissue contribute to pericytes and adipocytes that populate the tumor microenvironment*. Cancer Res., 2012. 72(20): p. 5198-5208.

Bolte, S. and F. P. Cordelieres, *A guided tour into subcellular colocalization analysis in light microscopy*. J Microsc, 2006. 224(Pt 3): p. 213-32.

Kolonin, M. G., et al., *Synchronous selection of homing peptides for multiple tissues by in vivo phage display*. FASEB J, 2006. 20(7): p. 979-81.

Su, F., et al., *Progression of prostate carcinoma is promoted by metastatic tumor cell stromal cell- secreted CXCL12 signaling in prostate epithelium*. NPJ Precis Oncol, 2021. 5(1): p. 26.

Ellerby, H. M., et al., *Hunter-killer peptide (HKP) for targeted therapy*. J Med Chem, 2008. 51(19): p. 5887-92.

Dongre, A., et al., *Epithelial-to-Mesenchymal Transition Contributes to Immunosuppression in Breast Carcinomas*. Cancer Res, 2017. 77(15): p. 3982-3989.

Su, F., et al., *Metastatic tumor cell stromal cell targeting suppresses prostate cancer epithelial- mesenchymal transition and chemoresistance*. Oncogene, 2019. 38(11): p. 1979-1988.

Zhou, C., et al., *Phage display screening identifies a novel peptide to suppress ovarian cancer cells in vitro and in vivo in mouse models*. BMC Cancer, 2015. 15: p. 889.

Yang, W., et al., *TMTP1, a novel tumor-homing peptide specifically targeting metastasis*. Clin Cancer Res, 2008. 14(17): p. 5494-502.

Scodeller, P., et al., *Precision Targeting of Tumor Macrophages with a CD206 Binding Peptide*. Sci Rep, 2017. 7(1): p. 14655.

What is claimed is:

1. A targeting polypeptide comprising the amino acid sequence selected from the group consisting of Breast Lung Metastasis-Homing Peptide (BLMP) 1-6 (SEQ ID NOs: 1-6), and wherein said targeting polypeptide binds to solid tumor cells, wherein the targeting polypeptide is less than 100 amino acids in length.

2. The targeting polypeptide of claim 1, wherein said targeting polypeptide comprises the sequence of SEQ ID NO: 1, and wherein said polypeptide binds to metastatic tumor cells.

3. The targeting polypeptide of claim 1, wherein the targeting polypeptide is cyclic.

4. The targeting polypeptide of claim 1, wherein said targeting polypeptide comprises entirely D-amino acids.

5. The targeting polypeptide of claim 1, wherein said targeting polypeptide comprises entirely L-amino acids.

6. A targeting polypeptide coupled or fused to an agent, wherein said targeting polypeptide consists of a targeting polypeptide of claim 1 and the agent is selected from the group consisting of an imaging agent, a cytotoxic agent, a pro-apoptotic agent, a fusion protein, a cytostatic agent, a cytocidal agent, radioisotope, a mitotic inhibitor, an antibiotic agent, an enzyme, an anti-angiogenic agent, and combinations thereof.

7. The targeting polypeptide of claim 6, wherein said agent is coupled to said targeting polypeptide with a linking moiety.

8. The targeting polypeptide of claim 7, wherein said linking moiety comprises aminohexanoic acid, $(CH_2)_4$, $(CH_2)_5$, $(CH_2)_6$, $(CH_2)_7$, $(CH_2)_8$ or a combination thereof.

9. The targeting polypeptide of claim 6, wherein said agent is selected from the group consisting of paclitaxel, accutin, angiostatin, cidofovir, vincristine, bleomycin, AGM-1470, platelet factor 4, minocycline, 5-fluorouracil, busulfan, camptothecin, carboplatin, chlorambucil, cisplatin (CDDP), cyclophosphamide, dactinomycin, daunorubicin, doxorubicin, etoposide (VP16), gemcitabine, ifosfamide, mechlorethamine, melphalan, mitomycin, navelbine, raloxifene, tamoxifen, taxol, temozolomide, transplatinum, vinblastine, methotrexate, docetaxel, teniposide, vinorelbine, plicamycin, idarubicin, tretinoin, mitoxantrone, hydroxyurea, procarbazine, and combinations thereof.

10. The targeting polypeptide of claim 6, wherein said agent is selected from the group consisting of gramicidin, magainin, mellitin, marimastat, defensin, and cecropin.

11. The targeting polypeptide of claim 6, wherein said agent is selected from the group consisting of (KFAKFAK)$_2$ (SEQ ID NO: 17), (KFXAKFXAK)$_2$ (SEQ ID NO: 18, (KHexAKHexAK)$_2$ (KLAKLAK)$_2$ (SEQ ID NO: 19), (KLAKKLA)$_2$ (SEQ ID NO: 14), (KAAKKAA)$_2$ (SEQ ID NO: 15), and (KLGKKLG)$_3$ (SEQ ID NO: 16).

12. The targeting polypeptide of claim 11, wherein said targeting polypeptide comprises D-amino acids.

13. The targeting polypeptide of claim 11, wherein said targeting polypeptide comprises L-amino acids.

14. The targeting polypeptide of claim 6, wherein said agent is selected from the group consisting of a fluorophore, a metal chelate complex, a radioisotope, a fluorescent marker, urease, alkaline phosphatase, a fluorescent protein, a magnetic particle and a luminescent protein.

15. A method of making a polypeptide to target metastatic tumor cell tissue comprising coupling an agent to a targeting polypeptide according to claim 1.

16. A method of delivering an agent to a metastatic tumor cell tissue comprising administering to the metastatic tumor cell tissue a targeting polypeptide coupled or fused to an agent of claim 6.

17. The method of claim 16, wherein the metastatic tumor cell tissue is in a human subject.

* * * * *

SEQUENCE LISTING

```
Sequence total quantity: 20
SEQ ID NO: 1            moltype = AA  length = 9
FEATURE                 Location/Qualifiers
REGION                  1..9
                        note = Synthetic amino acid
source                  1..9
                        mol_type = protein
                        organism = synthetic construct
```

```
SEQUENCE: 1
CRAGVGRGC                                                                          9

SEQ ID NO: 2            moltype = AA  length = 9
FEATURE                 Location/Qualifiers
REGION                  1..9
                        note = Synthetic amino acid
source                  1..9
                        mol_type = protein
                        organism = synthetic construct
SEQUENCE: 2
CLRHSSKIC                                                                          9

SEQ ID NO: 3            moltype = AA  length = 9
FEATURE                 Location/Qualifiers
REGION                  1..9
                        note = Synthetic amino acid
source                  1..9
                        mol_type = protein
                        organism = synthetic construct
SEQUENCE: 3
CHLSFSTAC                                                                          9

SEQ ID NO: 4            moltype = AA  length = 9
FEATURE                 Location/Qualifiers
REGION                  1..9
                        note = Synthetic amino acid
source                  1..9
                        mol_type = protein
                        organism = synthetic construct
SEQUENCE: 4
CEGPMYAKC                                                                          9

SEQ ID NO: 5            moltype = AA  length = 9
FEATURE                 Location/Qualifiers
REGION                  1..9
                        note = Synthetic amino acid
source                  1..9
                        mol_type = protein
                        organism = synthetic construct
SEQUENCE: 5
CSGVGIASC                                                                          9

SEQ ID NO: 6            moltype = AA  length = 9
FEATURE                 Location/Qualifiers
REGION                  1..9
                        note = Synthetic amino acid
source                  1..9
                        mol_type = protein
                        organism = synthetic construct
SEQUENCE: 6
CGVLPYSLC                                                                          9

SEQ ID NO: 7            moltype = DNA  length = 27
FEATURE                 Location/Qualifiers
misc_feature            1..27
                        note = Synthetic oligonucleotide
source                  1..27
                        mol_type = other DNA
                        organism = synthetic construct
SEQUENCE: 7
tgcagggccg gcgtgggcag gggctgc                                                      27

SEQ ID NO: 8            moltype = DNA  length = 26
FEATURE                 Location/Qualifiers
misc_feature            1..26
                        note = Synthetic oligonucleotide
source                  1..26
                        mol_type = other DNA
                        organism = synthetic construct
SEQUENCE: 8
gcctgaggca cagcagcaag atctgc                                                       26

SEQ ID NO: 9            moltype = DNA  length = 27
FEATURE                 Location/Qualifiers
misc_feature            1..27
                        note = Synthetic oligonucleotide
source                  1..27
                        mol_type = other DNA
```

```
                            -continued
                           organism = synthetic construct
SEQUENCE: 9
tgccacctga gcttcagcac cgcctgc                                      27

SEQ ID NO: 10              moltype = DNA   length = 27
FEATURE                    Location/Qualifiers
misc_feature               1..27
                           note = Synthetic oligonucleotide
source                     1..27
                           mol_type = other DNA
                           organism = synthetic construct
SEQUENCE: 10
tgcgagggcc ccatgtacgc caagtgc                                      27

SEQ ID NO: 11              moltype = DNA   length = 27
FEATURE                    Location/Qualifiers
misc_feature               1..27
                           note = Synthetic oligonucleotide
source                     1..27
                           mol_type = other DNA
                           organism = synthetic construct
SEQUENCE: 11
tgcagcggcg tgggcatcgc cagctgc                                      27

SEQ ID NO: 12              moltype = DNA   length = 27
FEATURE                    Location/Qualifiers
misc_feature               1..27
                           note = Synthetic oligonucleotide
source                     1..27
                           mol_type = other DNA
                           organism = synthetic construct
SEQUENCE: 12
tgcggcgtgc tgccctacag cctgtgc                                      27

SEQ ID NO: 13              moltype = AA    length = 14
FEATURE                    Location/Qualifiers
REGION                     1..14
                           note = Synthetic amino acid
source                     1..14
                           mol_type = protein
                           organism = synthetic construct
SEQUENCE: 13
KLAKLAKKLA KLAK                                                    14

SEQ ID NO: 14              moltype = AA    length = 14
FEATURE                    Location/Qualifiers
REGION                     1..14
                           note = Synthetic amino acid
source                     1..14
                           mol_type = protein
                           organism = synthetic construct
SEQUENCE: 14
KLAKKLAKLA KKLA                                                    14

SEQ ID NO: 15              moltype = AA    length = 14
FEATURE                    Location/Qualifiers
REGION                     1..14
                           note = Synthetic amino acid
source                     1..14
                           mol_type = protein
                           organism = synthetic construct
SEQUENCE: 15
KAAKKAAKAA KKAA                                                    14

SEQ ID NO: 16              moltype = AA    length = 21
FEATURE                    Location/Qualifiers
REGION                     1..21
                           note = Synthetic amino acid
source                     1..21
                           mol_type = protein
                           organism = synthetic construct
SEQUENCE: 16
KLGKKLGKLG KKLGKLGKKL G                                            21

SEQ ID NO: 17              moltype = AA    length = 14
FEATURE                    Location/Qualifiers
REGION                     1..14
                           note = Synthetic amino acid
source                     1..14
```

```
                        mol_type = protein
                        organism = synthetic construct
SEQUENCE: 17
KFAKFAKKFA KFAK                                                         14

SEQ ID NO: 18          moltype = AA   length = 18
FEATURE                Location/Qualifiers
REGION                 1..18
                       note = Synthetic amino acid
SITE                   3
                       note = misc_feature - Xaa can be any naturally occurring
                         amino acid
SITE                   7
                       note = misc_feature - Xaa can be any naturally occurring
                         amino acid
SITE                   12
                       note = misc_feature - Xaa can be any naturally occurring
                         amino acid
SITE                   16
                       note = misc_feature - Xaa can be any naturally occurring
                         amino acid
source                 1..18
                       mol_type = protein
                       organism = synthetic construct
SEQUENCE: 18
KFXAKFXAKK FXAKFXAK                                                     18

SEQ ID NO: 19          moltype = AA   length = 24
FEATURE                Location/Qualifiers
REGION                 1..24
                       note = Synthetic amino acid
REGION                 1..2
                       note = MISC_FEATURE - residues 1 and 2 are joined by a
                         6-carbon alkyl chain residue in the peptide backbone
REGION                 3..4
                       note = MISC_FEATURE - residues 3 and 4 are joined by a
                         6-carbon alkyl chain residue inthe peptide backbone
REGION                 6..7
                       note = MISC_FEATURE - residues 6 and 7 are joined by a
                         6-carbon alkyl chain residue inthe peptide backbone
REGION                 8..9
                       note = MISC_FEATURE - residues 8 and 9 are joined by a
                         6-carbon alkyl chain residue inthe peptide backbone
source                 1..24
                       mol_type = protein
                       organism = synthetic construct
SEQUENCE: 19
KAKAKKAKAK KLAKLAKKLA KLAK                                              24

SEQ ID NO: 20          moltype = AA   length = 14
FEATURE                Location/Qualifiers
REGION                 1..14
                       note = Synthetic amino acid
source                 1..14
                       mol_type = protein
                       organism = synthetic construct
SEQUENCE: 20
KLAKLAKKLA KLAK                                                         14
```